US011422521B2

(12) United States Patent
Baluja et al.

(10) Patent No.: US 11,422,521 B2
(45) Date of Patent: *Aug. 23, 2022

(54) CONFIGURING A LOAD CONTROL SYSTEM

(71) Applicant: Lutron Technology Company LLC, Coopersburg, PA (US)

(72) Inventors: Manisha Dahiya Baluja, Landsdale, PA (US); Erica L. Clymer, Northampton, PA (US); Aditya Charan Dara, Allentown, PA (US); Sanjeev Kumar, Harleysville, PA (US); Christopher Spencer, Coopersburg, PA (US)

(73) Assignee: Lutron Technology Company LLC, Coopersburg, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/347,002

(22) Filed: Jun. 14, 2021

(65) Prior Publication Data
US 2022/0035323 A1 Feb. 3, 2022

Related U.S. Application Data

(63) Continuation of application No. 16/579,033, filed on Sep. 23, 2019, now Pat. No. 11,036,197, which is a (Continued)

(51) Int. Cl.
*G05B 15/02* (2006.01)
*G05B 19/042* (2006.01)
*H05B 47/175* (2020.01)

(52) U.S. Cl.
CPC ........ *G05B 15/02* (2013.01); *G05B 19/0426* (2013.01); *H05B 47/175* (2020.01); *G05B 2219/2642* (2013.01); *Y02B 20/40* (2013.01)

(58) Field of Classification Search
CPC ... G05B 15/02; G05B 19/0426; H05B 47/175
See application file for complete search history.

(56) References Cited

U.S. PATENT DOCUMENTS 5,905,442 A 5/1999 Mosebrook et al.
8,228,163 B2 7/2012 Cash et al.
(Continued)

*Primary Examiner* — David E Choi

(57) ABSTRACT

A design software, e.g., a graphical user interface (GUI) software, may be used to design and/or configure a load control system. The design software may be executed on a network device (e.g., a personal computer, a laptop, a tablet, or a smart phone). The design software may allow for easy configuration of load control panels and effortless multiplication of configured panels during the design of the load control system. Each load control panel may have a plurality of control devices, such as load control devices (e.g., power modules, dimming modules, and/or switching modules), system controllers, and/or power supplies. The design software may allow for the configuration of load control panels having different types and numbers of control devices. In addition, the design software may allow for the multiplication of load control panels having the same configuration (e.g., the same type and number of control devices).

12 Claims, 28 Drawing Sheets

Related U.S. Application Data continuation of application No. 15/436,314, filed on Feb. 17, 2017, now Pat. No. 10,423,133.

(60) Provisional application No. 62/296,416, filed on Feb. 17, 2016.

(56) References Cited

U.S. PATENT DOCUMENTS

| | | | |
|---|---|---|---|
| 8,417,388 B2 | 4/2013 | Altonen et al. | |
| 10,423,133 B2 | 9/2019 | Baluja et al. | |
| 2013/0246924 A1* | 9/2013 | Tan | G06F 3/04842 715/736 |
| 2014/0001977 A1 | 1/2014 | Zacharchuk et al. | |
| 2014/0064735 A1* | 3/2014 | Thompson | H04N 21/4222 340/12.23 |
| 2014/0265568 A1 | 9/2014 | Crafts et al. | |
| 2014/0325410 A1* | 10/2014 | Jung | G06F 3/0488 715/765 |
| 2015/0185752 A1 | 7/2015 | Bard et al. | |
| 2015/0236908 A1* | 8/2015 | Kim | H04L 12/2809 709/221 |
| 2015/0253364 A1* | 9/2015 | Hieda | H02J 13/0075 702/62 |
| 2016/0124590 A1* | 5/2016 | Li | H04L 12/2809 715/734 |
| 2016/0170389 A1* | 6/2016 | Im | G05B 15/02 700/275 |
| 2016/0174146 A1* | 6/2016 | Wang | H04W 12/08 370/254 |
| 2016/0284207 A1* | 9/2016 | Hou | H04L 12/282 |
| 2017/0235470 A1* | 8/2017 | Baluja | H05B 47/175 715/735 |

\* cited by examiner

CONFIGURING A LOAD CONTROL SYSTEM

CROSS-REFERENCE TO RELATED APPLICATION

This application is a continuation of U.S. Non-Provisional patent application Ser. No. 16/579,033, filed on Sep. 23, 2019, which is a continuation of U.S. Non-Provisional patent application Ser. No. 15/436,314, filed Feb. 17, 2017, now U.S. Pat. No. 10,423,133, issued on Sep. 24, 2019, which claims the benefit of U.S. Provisional Patent Application No. 62/296,416, filed Feb. 17, 2016, each of which is hereby incorporated by reference herein in its entirety.

BACKGROUND

A load control environment, such as a residence or an office building, for example, may be configured with various types of load control systems. For example, a lighting control system may be used to control the lighting loads in the user environment. A motorized window treatment control system may be used to control the natural light provided to the user environment. A heating, ventilation, and air-conditioning (HVAC) system may be used to control the temperature in the user environment.

Each load control system may include various control devices, including control-source devices and control-target devices. The control-target devices may receive digital messages from one or more of the control-source devices. The digital messages may include load control messages for controlling an electrical load. The control-target devices may be capable of directly controlling the electrical load. The control-source devices may be capable of indirectly controlling the electrical load via the control-target device by sending digital messages to the control-target device that include control instructions for controlling the electrical load controlled by the control-target device. The control-source devices may be configured to transmit digital messages to the control-target devices via a wireless communication link, e.g., a radio-frequency (RF) communication link, and/or a wired communication link, e.g., a digital addressable lighting interface (DALI) communication link. Examples of control-target devices may include lighting control devices (e.g., dimmer switches, electronic switches, ballasts, or light-emitting diode (LED) drivers), motorized window treatments, temperature control devices (e.g., thermostats), plug-in load control devices, and/or the like. Examples of control-source devices may include remote control devices, occupancy sensors, daylight sensors, temperature sensors, window sensors, and/or the like. To enable a control-target device to recognize instructions received from a control-source device, the control-target device and the control-source device may be associated with one another, such that the control-target device may recognize the digital messages received from the control-source device.

The load control system may include one or more load control panels (e.g., a lighting panel) for controlling the amount of power delivered to one or more electrical loads (e.g., lighting loads). Each load control panel may have a plurality of control devices, such as load control devices (e.g., power modules, dimming modules, and/or switching modules), system controllers, and/or power supplies. The load control system may include multiple load control panels having different types and numbers of control devices. Load control panels having the same configuration (e.g., the same type and number of control devices) may be used multiple times in a single load control system.

SUMMARY

As described herein, a design software, e.g., a graphical user interface (GUI) software, may be used to design and/or configure a load control system. The design software may allow for easy configuration of load control panels and effortless multiplication of configured panels during the design of the load control system. The design software may be executed on a network device (e.g., a personal computer, a laptop, a tablet, a smart phone, or equivalent device). The design software may display a canvas on a visual display of the network device for adding and connecting the control devices of the load control system. The design software may allow for the configuration of load control panels having different types and numbers of control devices. In addition, the design software may allow for the multiplication of load control panels having the same configuration (e.g., the same type and number of control devices).

The design software may display a first panel icon representing a first load control panel and/or a configuration window for the first load control panel. A listing of control devices that may be installed in the first load control panel may be displayed on the configuration window. An additional control device may be added to the listing on the configuration window in response to the selection of the additional control device. A model number may be generated for the first load control panel having the control devices displayed in the listing on the configuration window. The model number may be associated with the first panel icon. Also, or alternatively, the panel icon may be displayed on a canvas and/or the model number for the load control panel may be displayed on a palette next to the canvas. The model number may be selected from the palette, for example, to add a second panel icon representing a second load control panel to the canvas. The second load control panel may have the same control devices as the first load control panel.

As further described herein, the design software may display a device icon representing an electrical device and/or a panel icon representing a load control panel. A configuration window for the load control panel may be displayed. A listing of control devices that may be installed in the load control panel may be displayed on the configuration window. An additional control device may be added to the listing on the configuration window, for example, in response to the selection of the additional control device. A panel output selection window may be displayed in response to the selection of the device icon and/or the panel icon. The electrical device may be defined to be related to (e.g., connected to or associated with) a selected output of a selected control device of the load control panel, for example, in response to the selection of the selected output of the selected control device of the load control panel from the panel output selection window.

DETAILED DESCRIPTION

Figure 1:
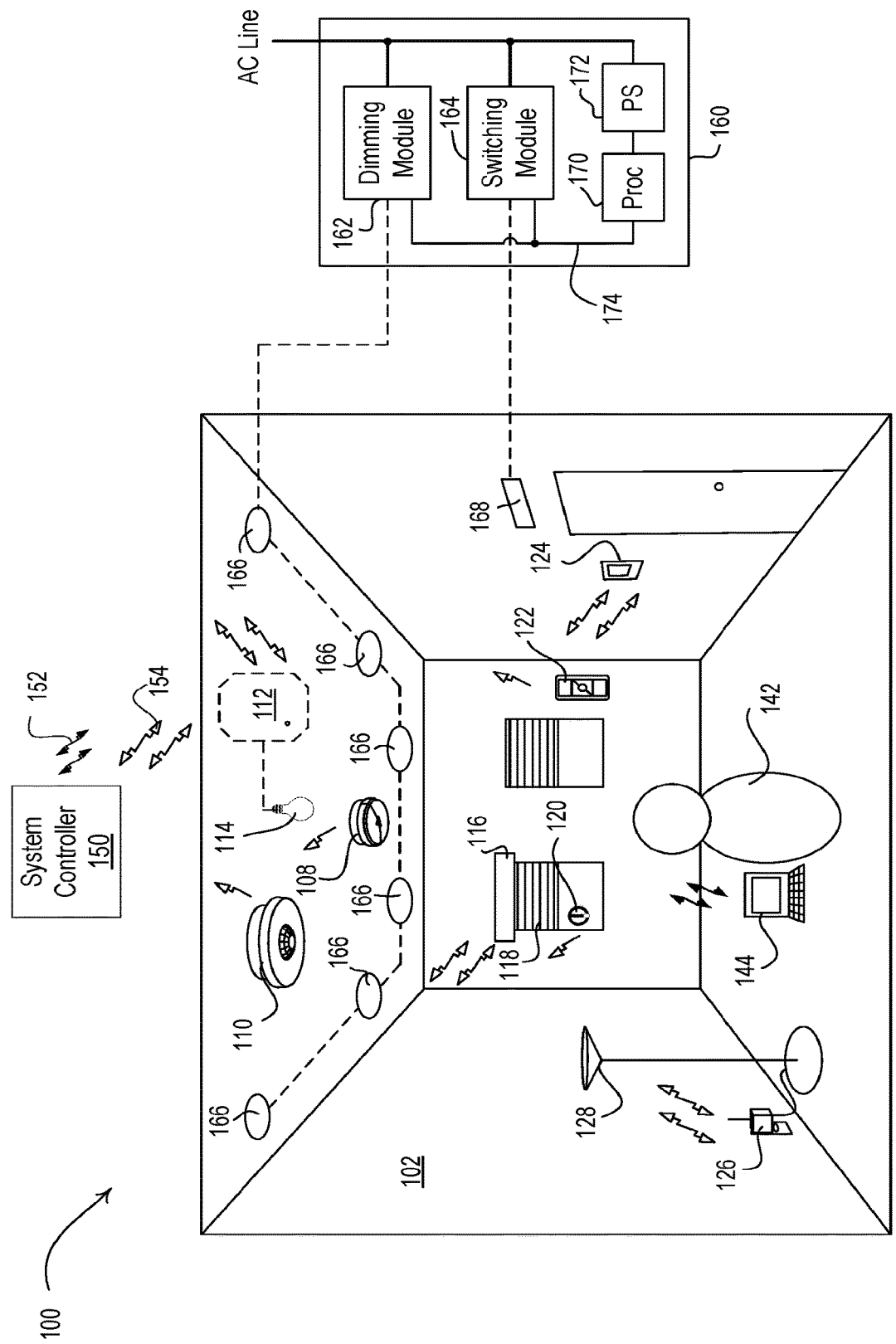
FIG. 1 is a system diagram that illustrates an example load control system for associating control devices and controlling electrical loads.

FIG. 1 depicts a load control system 100 that may include control-source devices and control-target devices. As shown in FIG. 1, the load control system 100 may be installed in a load control environment, e.g., a room 102 of a building. The load control system 100 may include control-target devices that may be capable of controlling (e.g., directly controlling) an electrical load. For example, load control system 100 may include a lighting control device 112. The lighting control device 112 may be a ballast, a light emitting diode (LED) driver, a dimmer switch, and/or the like. The lighting control device 112 may be capable of directly controlling an amount of power provided to lighting load 114. Load control system 100 may include one or more control-target devices, such as a motorized window treatment 116 for directly controlling the covering material 118 (e.g., via an electrical motor), a plug-in load control device 126 for directly controlling a floor lamp 128, a desk lamp, and/or other electrical loads that may be plugged into the plug-in load control device 126, and/or a temperature control device 124 (e.g., thermostat), for directly controlling an HVAC system.

The load control system 100 may comprise a load control panel 160 (e.g., a lighting panel) that includes (e.g., houses) multiple control devices of the load control system. The load control panel 160 may include one or more load control devices, such as power modules, dimming modules (e.g., dimming module 162), and/or switching modules (e.g., switching module 164). The load control panel 160 may receive an AC line voltage for powering the dimming module 162 and the switching module 164. The dimming module 162 may be configured to control the intensities of a plurality of lighting loads 166 of the room 102. The switching module 164 may be configured to turn on and off a lighting load 168 of the room 102. The load control panel 160 may also include one or more system controllers (e.g., a processor 170) and/or power supplies (e.g., a power supply 172). The power supply 172 may receive the AC line voltage and generate a supply voltage for powering the processor 170. The processor 170 may be configured to control the dimming module 162 and the switching module 164 via a panel communication link 174. The processor 172 may operate as a control-target device of the load control system. For example, the load control devices, system controllers, and power supplies of the load control panel 160 may be mounted to DIN rail within the panel (e.g., the load control panel may be a DIN rail panel 232 as discussed with respect to FIG. 3).

The control-source devices in load control system 100 may include a remote control device 122, an occupancy sensor 110, a daylight sensor 108, and/or a window sensor 120. The control-source devices may send digital messages to associated control-target devices for indirectly controlling an electrical load by transmitting digital messages, such as load control messages, to the control-target devices. The remote control device 122 may send digital messages for controlling a control-target device after actuation of one or more buttons. The occupancy sensor 110 may send digital messages to a control-target device based on an occupancy or vacancy condition (e.g., movement or lack of movement) that is sensed within its observable area. The daylight sensor 108 may send digital messages to a control-target device based on the detection of an amount of light within its observable area. The window sensor 120 may send digital messages to a control-target device based on a measured level of light received from outside of the load control system 100. For example, the window sensor 120 may detect when sunlight is directly shining into the window sensor 120, is reflected onto the window sensor 120, and/or is blocked by external means, such as clouds or a building. The window sensor 120 may send a digital message indicating the measured light level.

The control-source devices and/or the control-target devices may be in communication with a system controller 150. The system controller 150 may be capable of transmitting digital messages to, and/or receiving digital messages from, control devices (e.g., control-source devices and/or control-target devices). The digital messages may include association information for associating control-source devices and/or control-target devices. The system controller 150 may maintain the association between the control-target device and the control-source device when the system controller is integrated into the load control system. The system controller 150 may maintain the association between devices to enable control of the control-target devices by the associated control-source devices after integration of the system controller 150 into the load control system.

The system controller 150 may facilitate communication of control information from control-source devices to associated control-target devices using the association information. For example, the system controller 150 may communicate with one or more control devices (e.g., control-source devices and/or control-target devices) using the radio frequency (RF) signals 154. The system controller 150 may communicate via WI-FI® signals 152. For example, the system controller 150 may communicate with one or more network devices, such as a personal computer (PC) 144, a laptop, a tablet, a smart phone, or equivalent device via WI-FI® signals 152. The system controller 150 may be a gateway device, a network bridge device, an access point, and/or the like. Examples of load control systems having system controllers 150 are described in greater detail in commonly-assigned U.S. Patent Application Publication No. 2014/0001977, published Jan. 2, 2014, entitled LOAD CONTROL SYSTEM HAVING INDEPENDENTLY-CONTROLLED UNITS RESPONSIVE TO A BROADCAST CONTROLLER, and U.S. Patent Application Publication No. 2015/0185752, published Jul. 2, 2015, entitled WIRELESS LOAD CONTROL SYSTEM, the entire disclosures of which are hereby incorporated by reference.

The control-source devices in load control system 100 may be associated with the control-target devices using various association techniques. For example, in an association procedure, the control-source devices may be associated with the control-target devices by the user 142 actuating a button on the control-source device and/or the control-target device. The actuation of the button on the control-source device and/or the control-target device may place the control-source device and/or the control-target device in an association mode, for example, for being associated with one another. In the association mode, the control-source device may transmit an association message to the control-target device. The association message from a control-source device may include a unique identifier of the control-source device. The control-target device may locally store the unique identifier of the control-source, such that the control-target devices may be capable of recognizing digital messages (e.g., subsequent digital messages) from the control-source device that may include load control instructions. The control-target device may be capable of responding to the digital messages from the associated control-source device by controlling a corresponding electrical load according to the load control instructions received in the digital messages. Examples of load control systems are described in greater detail in commonly-assigned U.S. Pat. No. 5,905,442, issued May 18, 1999, entitled METHOD AND APPARATUS FOR CONTROLLING AND DETERMINING THE STATUS OF ELECTRICAL DEVICES FROM REMOTE LOCATIONS, and U.S. Pat. No. 8,417,388, issued Apr. 9, 2013, entitled LOAD CONTROL SYSTEM HAVING AN ENERGY SAVINGS MODE, the entire disclosures of which are hereby incorporated by reference.

The load control system 100 may be designed and/or configured using a design software, e.g., a graphical user interface (GUI) software, running on a network device, such as a personal computer (PC) 144, a laptop, a tablet, a smart phone, or equivalent device having a visual display. Using the design software, a user may select the electrical devices (e.g., the electrical loads and/or the control devices of the load control system, such as control-source devices and/or control target devices). The user may define relationships between (e.g., generate connections and/or associations) between selected electrical devices of the load control system. The relationships (e.g., connections and/or associations) generated by the design software may define the operation of the load control system during normal operation. For example, the relationship may define an electrical connection (e.g., a physical electrical connection, such as power wiring) between the first and second electrical devices, and/or an association between the first and second electrical devices (e.g., a control relationship, such as an association between wireless control devices). Examples of configuration procedures for load control systems are described in greater detail in commonly-assigned U.S. Pat. No. 8,228,163, issued Jul. 24, 2012, entitled HANDHELD PROGRAMMER FOR LIGHTING CONTROL SYSTEM, and U.S. Patent Application Publication No. 2014/0265568, published Sep. 18, 2014, entitled COMMISSIONING LOAD CONTROL SYSTEMS, the entire disclosures of which are hereby incorporated by reference.

FIGS. 2-22 illustrate example screenshots that may be displayed on a visual display of a network device by a design software, e.g., a graphical user interface (GUI) software, for designing and/or configuring a load control system (e.g., a building control system). The design software may display a canvas 200 on which electrical devices (e.g., control devices of the load control system) may be illustrated. A user of the design software may interact with the elements of the software using a cursor 202 (e.g., by manipulating a mouse or other input device to move the cursor).

Figure 2:
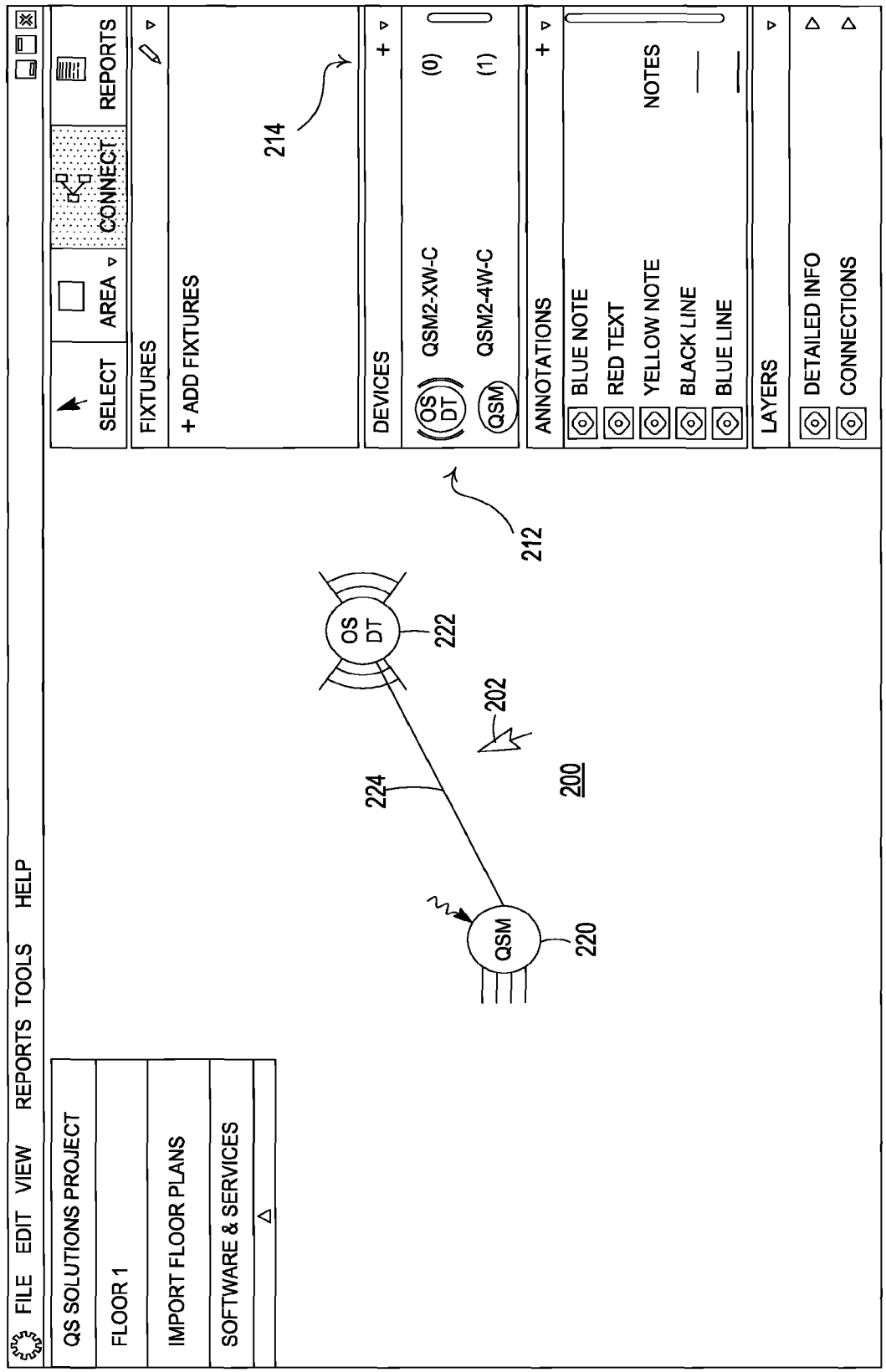
FIGS. 2-22 illustrate example screenshots that may be displayed on a visual display of a network device by a design software, e.g., a graphical user interface (GUI) software, for designing and/or configuring a load control system (e.g., a building control system).

The design software may display a palette column 210 (e.g., a column of palettes) that may be located, for example, to the right of the canvas as shown in FIG. 2. The palette column 210 may include one or more windows (e.g., palettes) that each include items that may be added to the canvas 200, such as fixtures (e.g., lighting fixtures), devices (e.g., control devices of the load control system), and annotations. For example, a devices window 212 may display one or more control devices of the load control system, which may be added to the canvas. The user may add additional control devices to the devices window 212 by clicking on an "add devices" button 214 (e.g., signified by a "+" character) on the devices window.

The user may click on one of the control devices listed in the devices window 212 and place (e.g., drop, stamp, and/or drag) the selected control device onto the canvas 200. As shown in FIG. 2, the design software may display a first device icon 220 representing a first electrical device and a second device icon 222 representing a second electrical device on the canvas 200. For example, the first electrical device may be a control-target device, such as a sensor module or a load control device, and the second electrical device may be a control-source device, such as an occupancy sensor. The first electrical device may be, for example, an electrical load, such as a lighting load, and the second electrical device may be a load control device, such as a dimmer switch, for controlling the electrical load. The user may make an association between the first electrical device and the second electrical device by drawing a line 224 (e.g., a straight line) between the first device icon 220 and the second device icon 222 on the canvas 200 as shown in FIG. 2.

Figure 3:
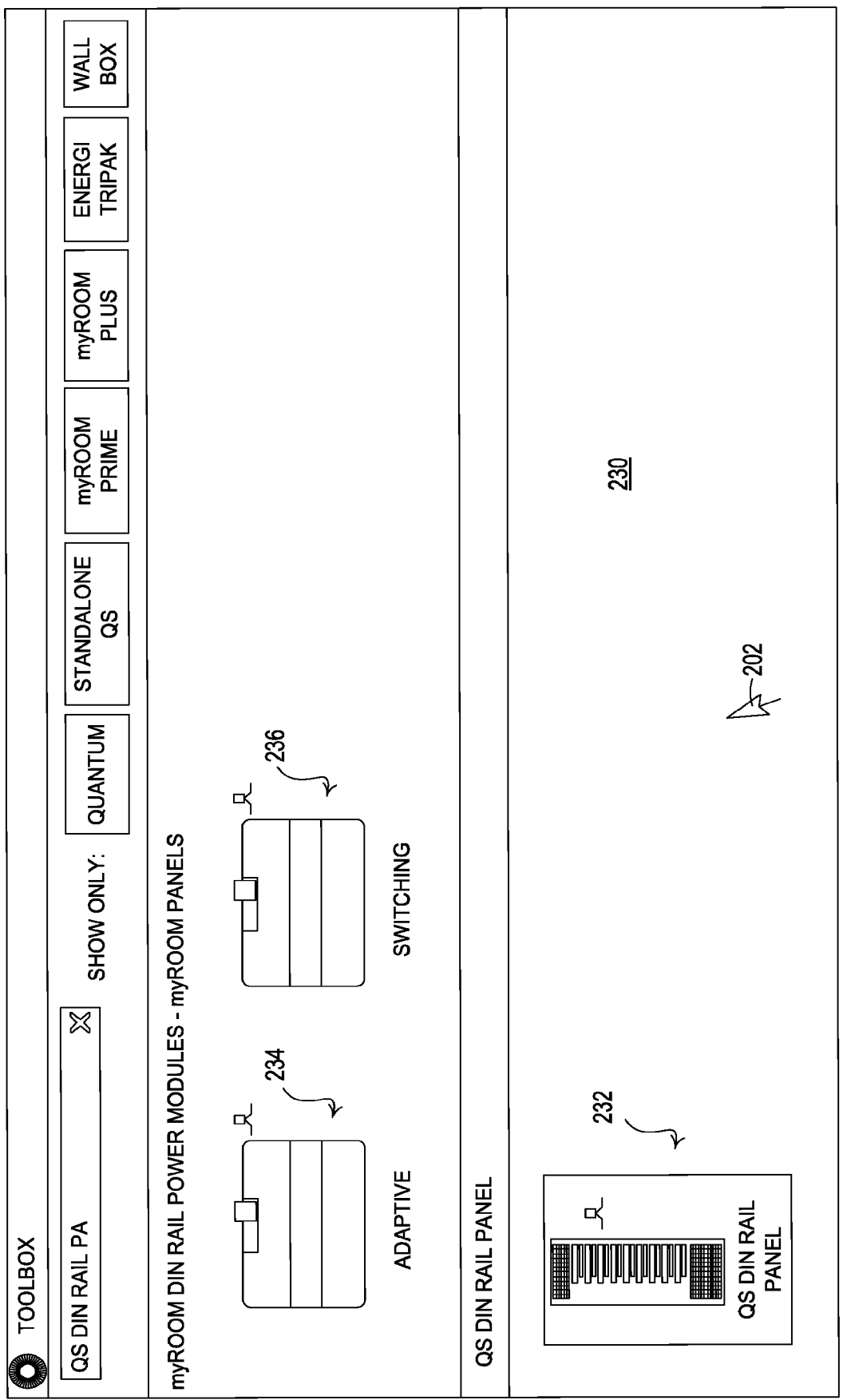
Figure 4:
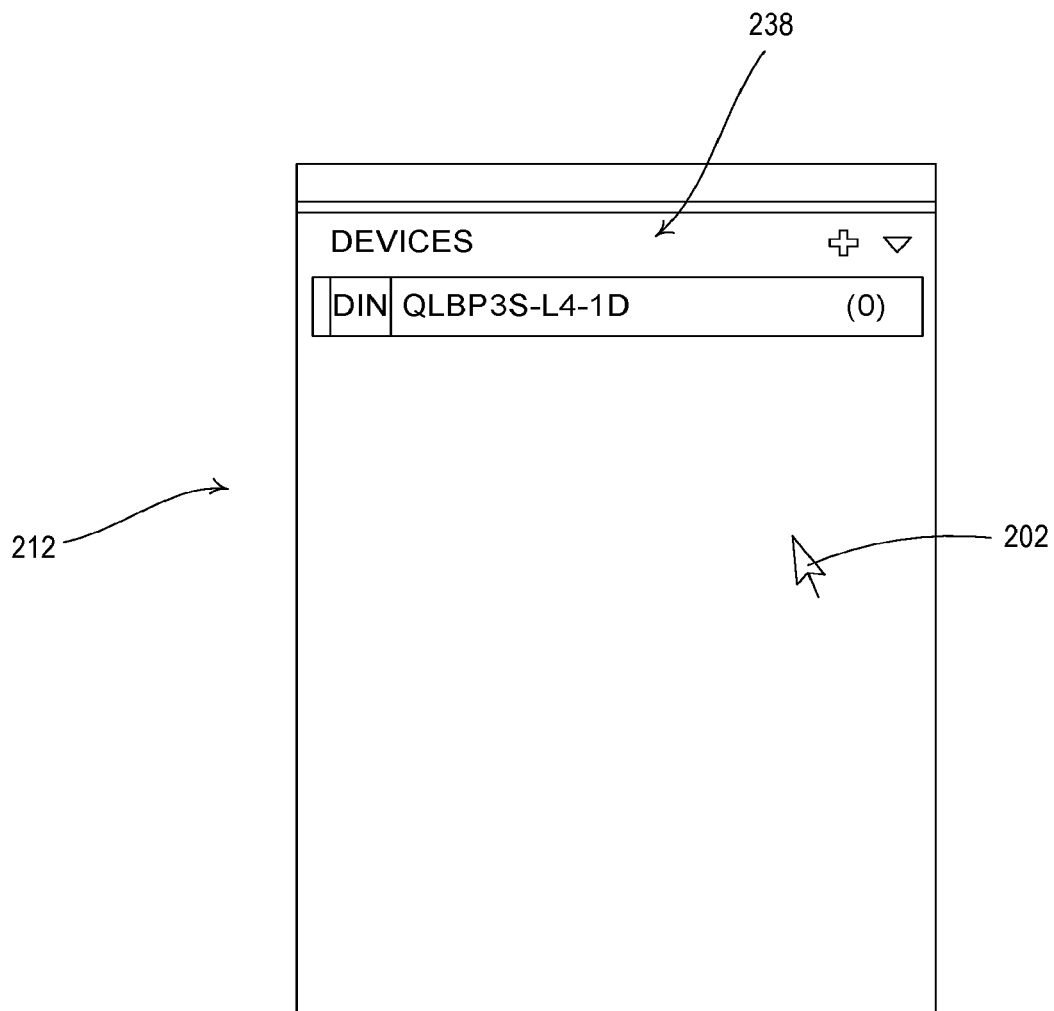

The user may add a load control panel (e.g., the load control panel 160) to the canvas 200. The load control panel may include one or more control devices, such as load control devices (e.g., power modules, dimming modules, and/or switching modules), system controllers, and/or power supplies. For example, the load control panel may be a DIN rail panel 232 that may include one or more DIN rail power modules mounted to DIN rail within the panel. To add a load control panel to the canvas 200, the user may select the "add devices" button 214 on the devices window 212 to display a toolbox window 230, as shown in FIG. 3. For example, the toolbox window 230 may display a DIN rail panel 232 and two power modules, such as an adaptive dimming module 234 and a switching module 236. The user may select the DIN rail panel 232 to add a load control panel to the canvas 200. After the user selects the DIN rail panel 232 from the toolbox window 230, the toolbox window may close and the devices window 212 on the palette column 210 may display a model number (e.g., a default DIN rail panel module number 238) for the DIN rail panel 232, as shown in FIG. 4.

Figure 5:
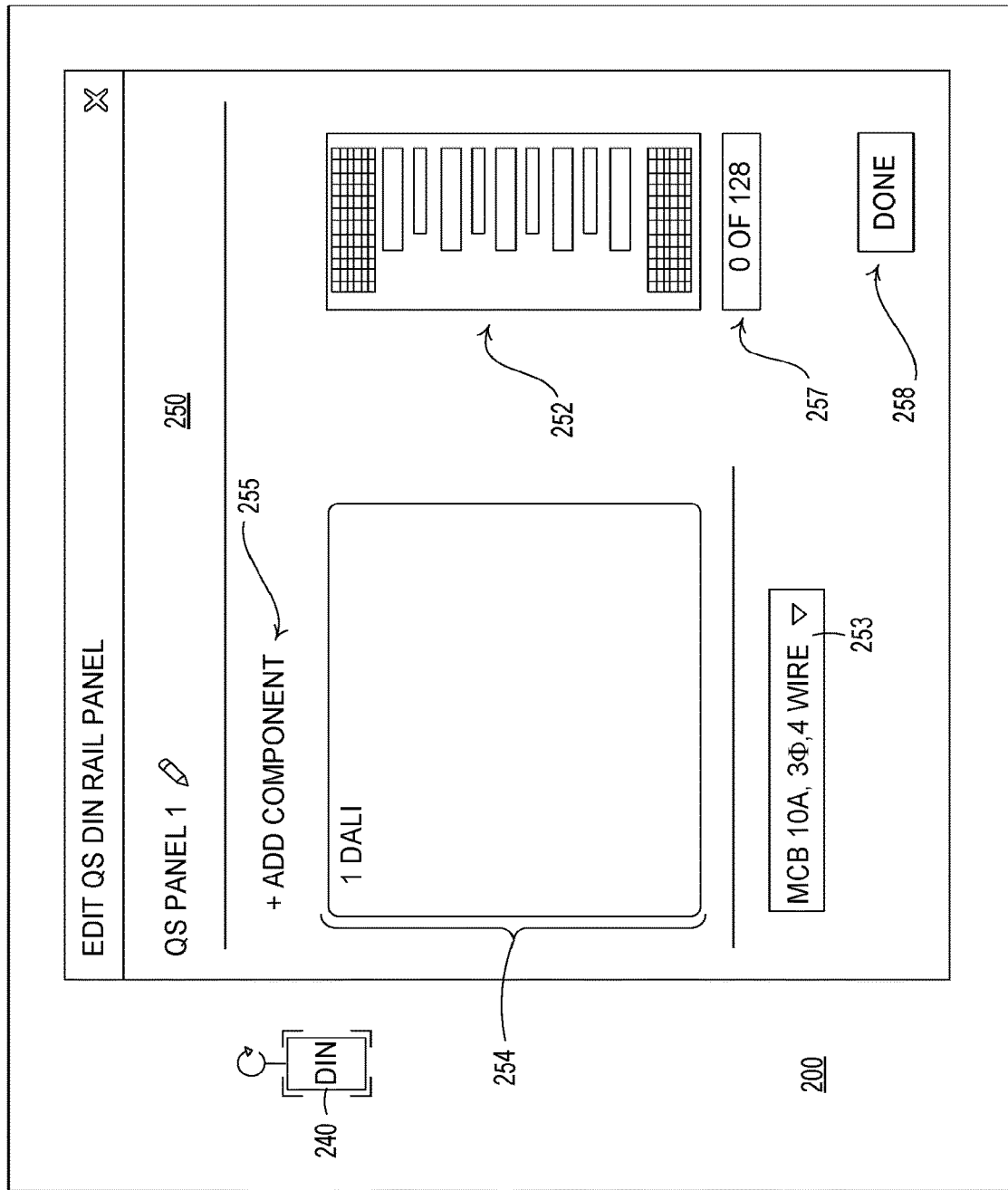

After the default DIN rail panel module number 238 is added to the devices window 212, the user may select the default DIN rail panel module number 238 and place (e.g., drop, stamp, and/or drag) a panel icon 240 onto the canvas 200 as shown in FIG. 5. The panel icon 240 may represent a load control panel (e.g., a DIN rail panel) of the load control system. The user may select the panel icon 240 with the cursor 202 (e.g., by double-clicking a button on the mouse) to display a panel configuration window 250. The panel configuration window 250 may allow the user to select the components (e.g., control devices) to be added to the DIN rail panel. For example, the control devices that may be included in a load control panel may be load control devices (e.g., DALI control modules, Ecosystem® control modules ("ECO"), 0-10V control modules, switching modules, motor control modules, and/or adaptable dimming modules), system controllers (e.g., processors, DMX controllers, contact closure input/output (IO) controllers, and/or network controllers), and/or power supplies.

The panel configuration window 250 may display a listing 254 of the control devices of the load control panel. By default, the listing 254 may list a single DALI control module in the load control panel, as shown in FIG. 5. The panel configuration window 250 may display a circuit breaker pull-down menu 253 for selecting a circuit breaker for the load control panel. For example, the circuit breaker may be a miniature circuit breaker (MCB), a residual current circuit breaker with over current protection (RCBO), or other circuit breaker. The panel configuration window 250 may display an image 252 of the panel, e.g., a DIN rail panel having four DIN rails, as shown in FIG. 5. Further, the panel configuration window 250 may display a zone capacity block 257 to show the total number of zones that the load control panel can control.

Figure 6:
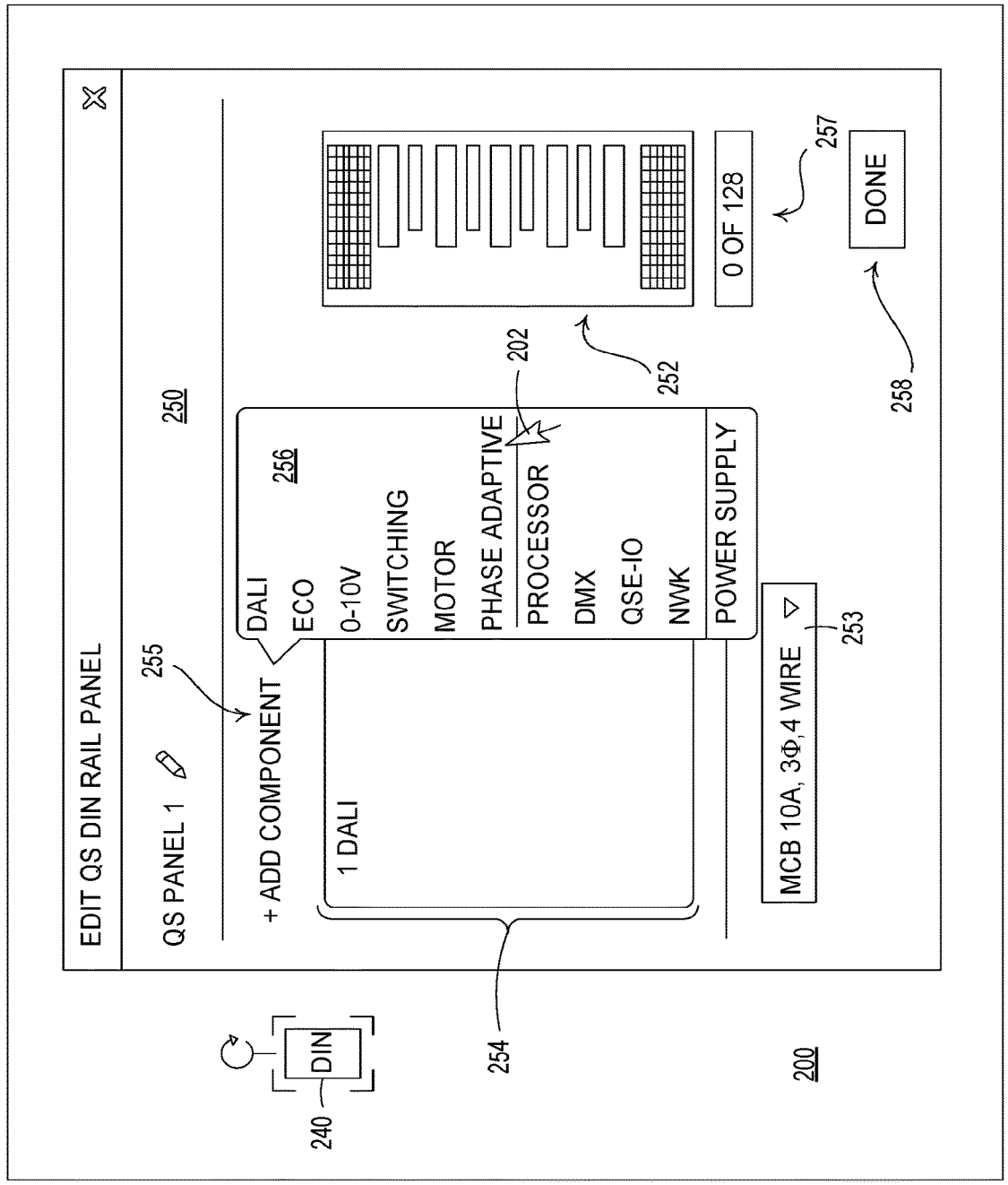
Figure 7:
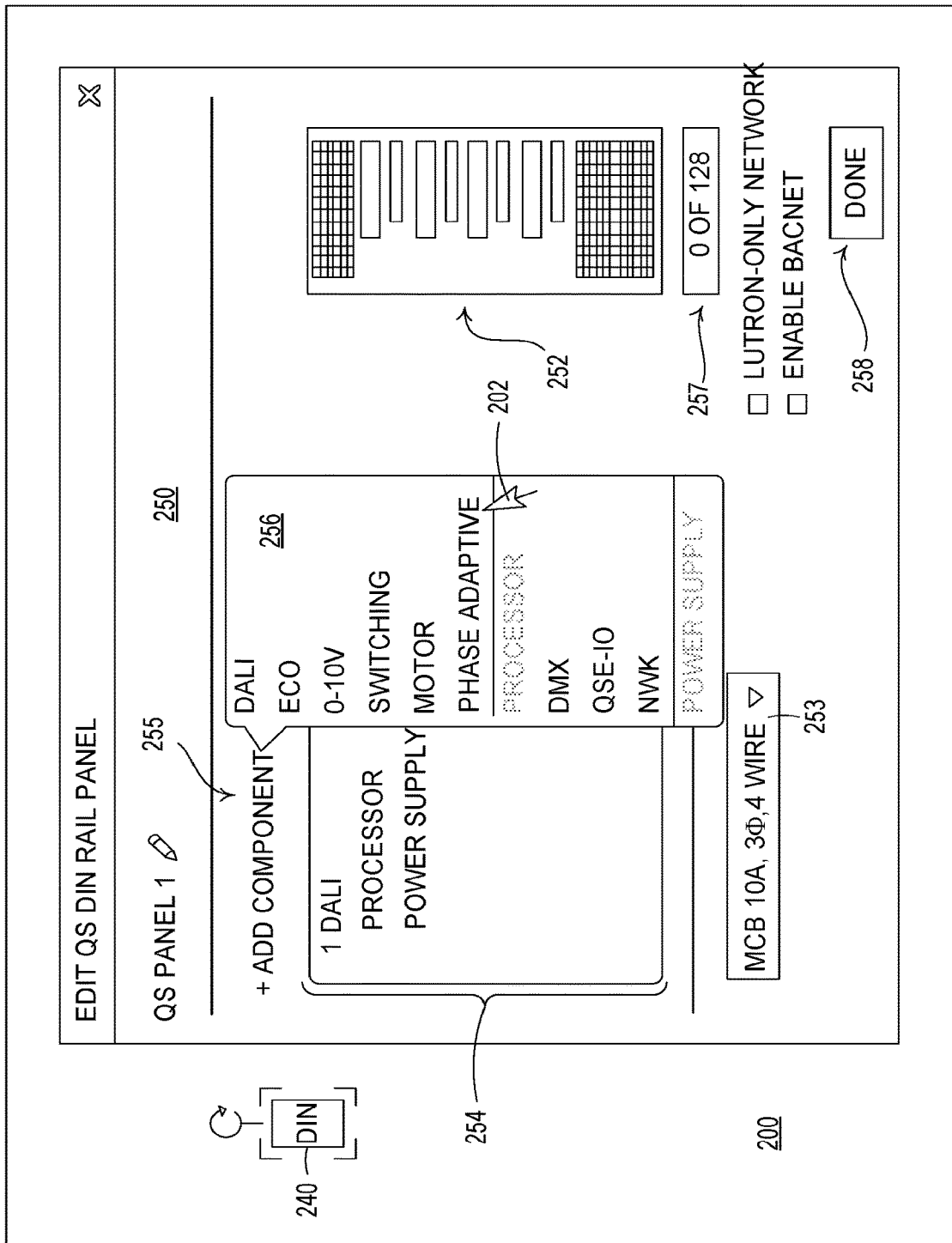

To add control devices to the load control panel, the user may click on an "add component" button 255 to display an "add component" window 256, as shown in FIG. 6. For example, the user may select "Processor" from the "add component" window 256 to add a processor to the load control panel, and select "Power Supply" from the "add component" window 256 to add a power supply to the load control panel. If the power supply is required to be installed in the load control panel to power the processor (e.g., according to predetermined rules defined by the manufacturer of the load control panel), both the processor and the power supply may be automatically added to the load control panel when the user selects "Processor" from the "add component" window 256. After the processor and the power supply are added to the load control panel, the listing 254 may include entries for the processor and the power supply as shown in FIG. 7. The image 252 may be updated to show additional space at the bottom of the panel for the processor and the power supply as shown in FIG. 7.

The panel configuration window 250 may be adjusted (e.g., dynamically adjusted) according to manufacturer design rules defining the construction of the load control panel. A manufacturer design rule may define that, for example, a load control panel may be configured to have a predetermined number of control devices installed in it. For example, a DIN rail panel may be configured to have up to eight load control devices, two system controllers, and one power supply. The DIN rail panel may be limited to having, for example, one of each type of system controller. After the processor and the power supply are added to the load control panel, the text depicting these entries in the "add component" window 256 may be changed to a different color than the other entries (e.g., grayed out) as shown in FIG. 7, and these entries in the "add component" window 256 may not be subsequently selected while the listing 254 includes the processor and the power supply. The text depicting the processor and power supply may be deleted from the "add component" window 256 while the listing 254 includes the processor and the power supply.

Figure 8:
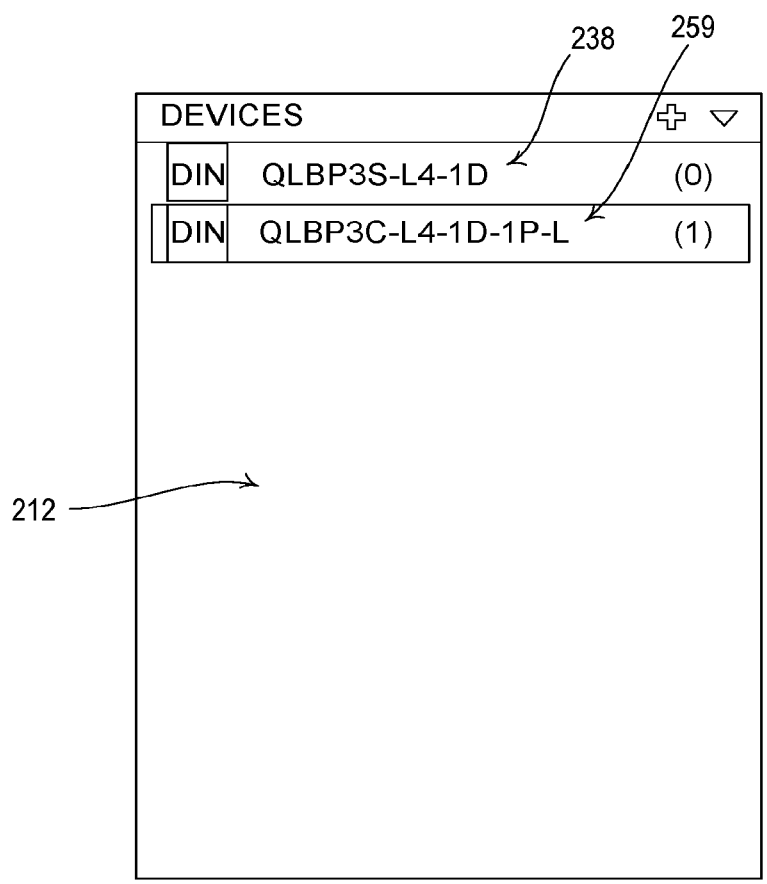

To complete configuration of the load control panel, the user may select a "done" button 258 on the panel configuration window 250. After the user selects the "done" button 258, the panel configuration window 250 may close and the panel icon 240 may remain on the canvas 200. The devices window 212 on the palette column 210 may display a model number (e.g., a specific DIN rail panel module number 259) for the DIN rail panel that was configured using the panel configuration window 250, as shown in FIG. 8. Different combinations of control devices (e.g., load control devices, system controllers, and power supplies) in a DIN rail panel may correspond to a unique model number, which may be displayed as the specific DIN rail panel module number 259 on the devices window 212.

Figure 9:
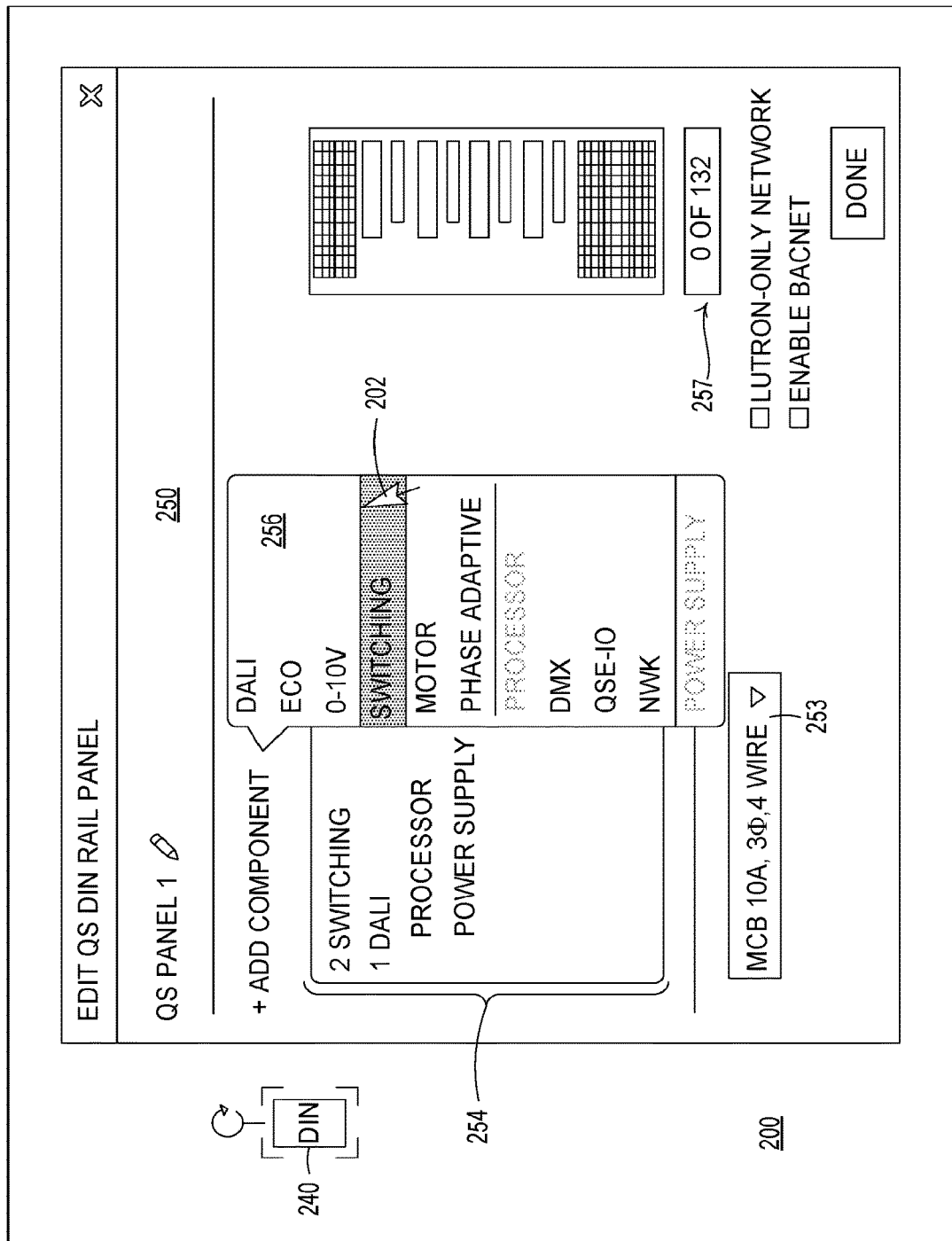

To edit the load control panel, the user may select the panel icon 240 on the canvas 200 with the cursor 202 (e.g., by double-clicking a button on the mouse) to display the panel configuration window 250 once again. The user may select the "add component" button 255 to display the "add component" window 256 to add additional control devices to the load control panel. For example, the user may select "Switching" from the "add component" window 256 to add a switching module to the load control panel as shown in FIG. 9. After the switching module is added to the load control panel, the listing 254 may include an entry for the switching module. The load control modules may be ordered in a DIN rail panel per predetermined guidelines determined by the manufacturer of the DIN rail panel. For example, the manufacturer may construct the DIN rail panel such that switching modules are grouped together above DALI control modules. The entries for the switching module and the DALI control module in the listing 254 may be ordered to represent the order that the load control devices may be installed in the load control panel, as shown in FIG. 9. After the switching module is added to the load control panel, the zone capacity block 257 may be updated (e.g., automatically updated), as shown in FIG. 9.

Figure 10:
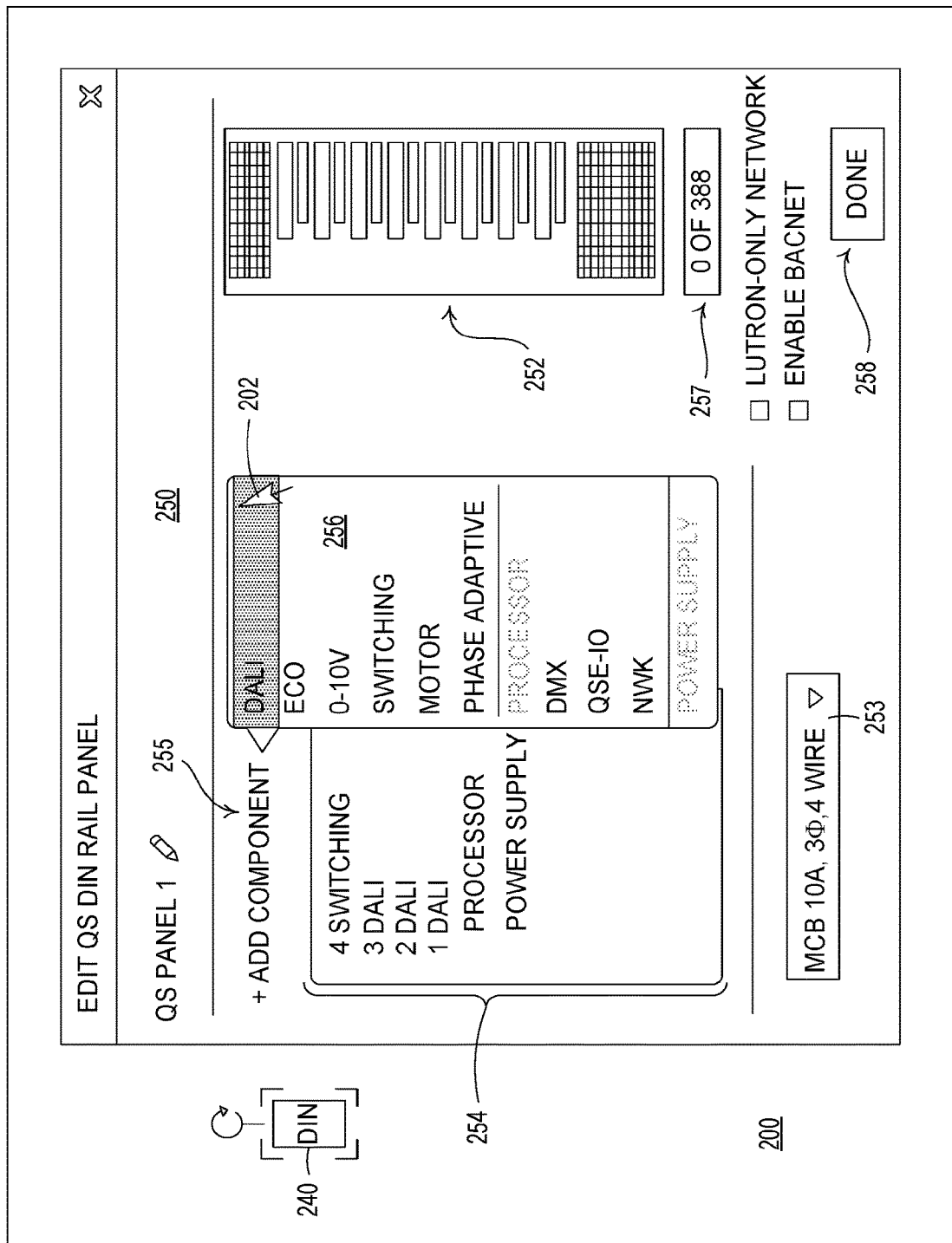

The number of possible entries in the listing 254 and the number of DIN rails in the image 252 may be adjusted (e.g., automatically adjusted) in response to the selection of additional load control devices in the "add component" window 256, as shown in FIG. 10. For example, if the user selects two additional DALI control modules from the "add component" window 256 (to have a total of four load control devices), the listing 254 may be updated (e.g., automatically updated) to have eight possible entries and the image 252 may be updated (e.g., automatically updated) to have eight DIN rails. The entries for the additional DALI control modules may be listed next to the previously-listed DALI control module in the listing 254, as shown in FIG. 10.

Figure 11:
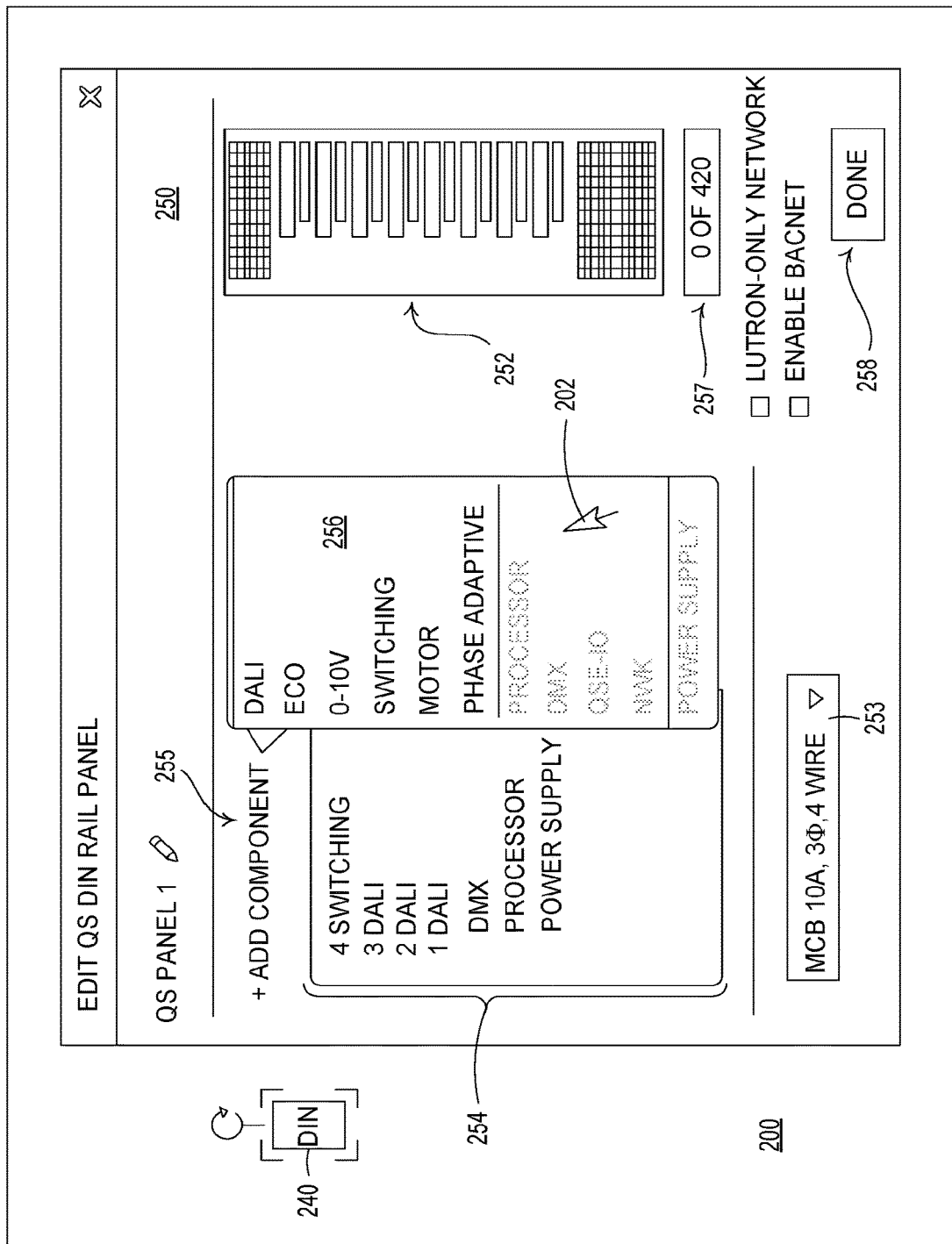

The user may add additional system controllers using the "add component" window 256. For example, the user may select "DMX" from the "add component" window 256 to add a DMX controller to the load control panel, as shown in FIG. 11. After the DMX controller is added to the load control panel, the listing 254 may include an entry for the DMX controller. Because the load control panel may have two system controllers (as previously mentioned), the text depicting the possible system controllers in the "add component" window 256 may be changed to a different color than the other entries (e.g., grayed out), as shown in FIG. 11, and the entries for the system controllers may not be selected while the listing 254 includes two system controllers. The entries for the system controllers may be deleted from the "add component" window 256 while the listing 254 includes two system controllers.

Figure 12:
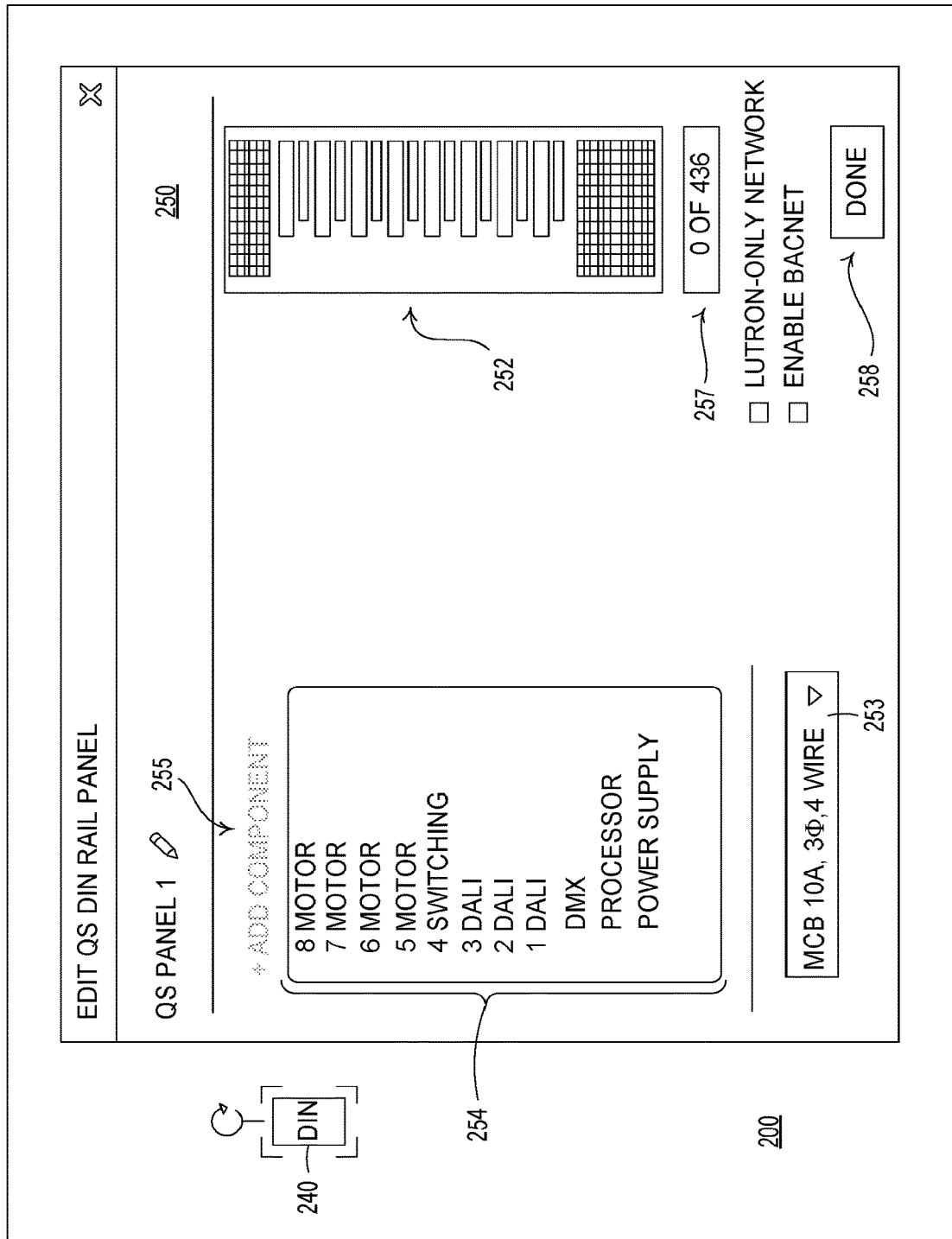

If the number of control devices in the load control panel has reached a maximum limit, the text for the "add component" button 255 may be changed to a different color (e.g., grayed out) as shown in FIG. 12, and the "add component" button 255 may not be selected while the panel is at capacity. The "add component" button 255 may be deleted from the panel configuration window 250 if the number of control devices of the load control panel has reached the maximum limit. For example, the number of control devices in the load control panel may reach the maximum limit when the panel includes eight load control devices, two system controllers, and one power supply. As shown in FIG. 12, the user may add motor control modules to the listing 254 to cause the load control panel to reach the maximum limit. The entries for motor control modules may be grouped (e.g., automatically grouped) together above the switching modules and DALI modules (e.g., per manufacturer guidelines), as shown in FIG. 12.

Figure 13:
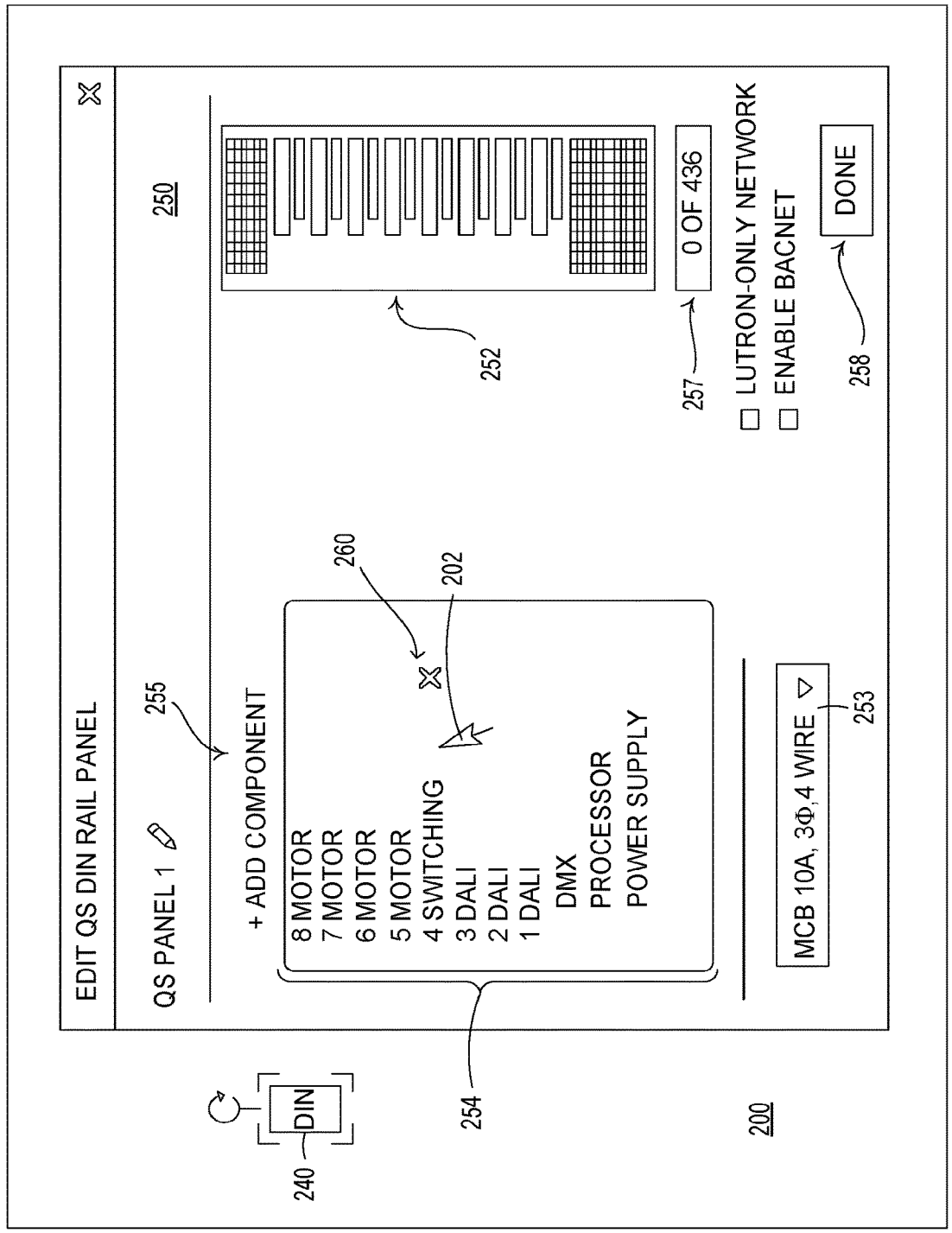
Figure 14:
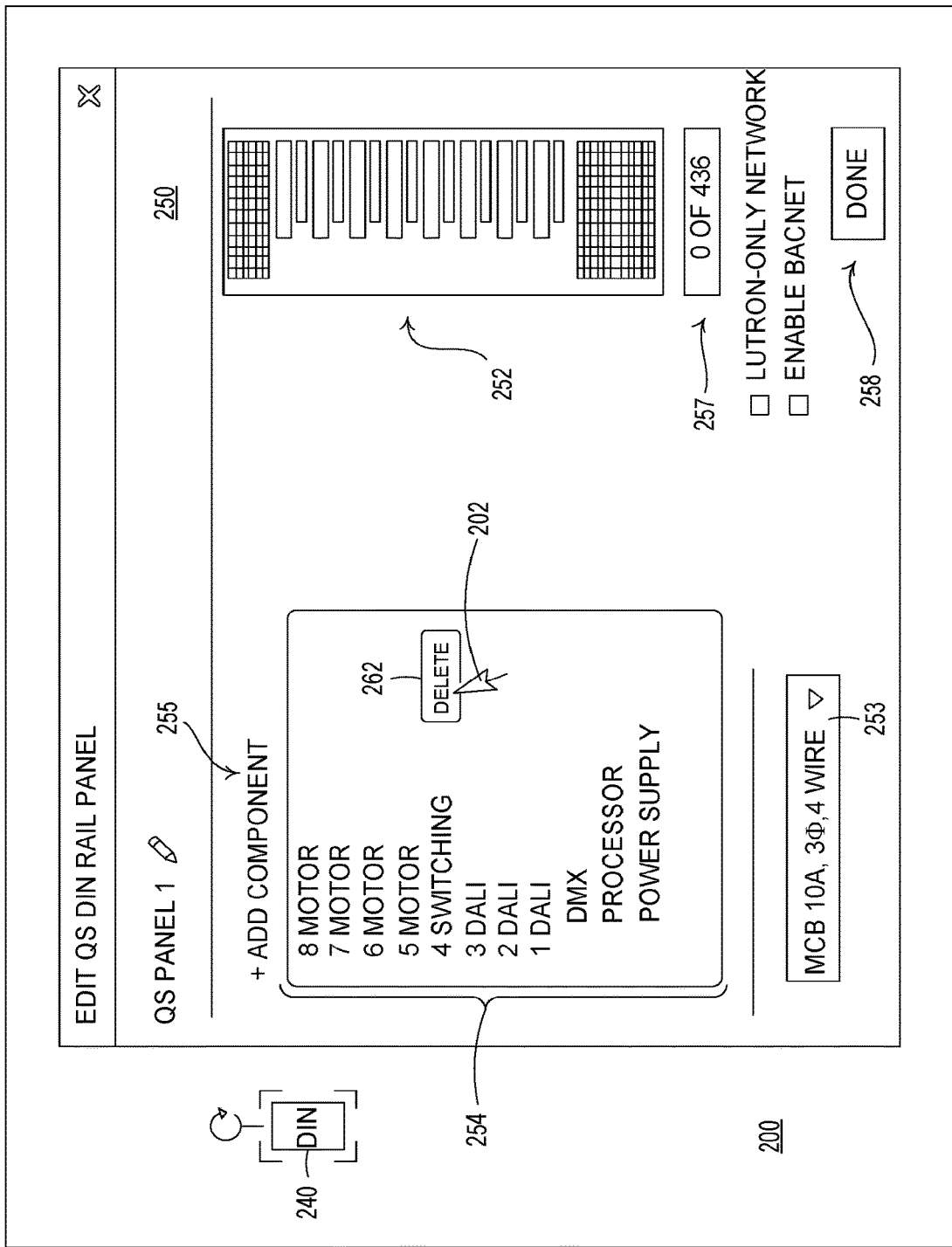
Figure 15:
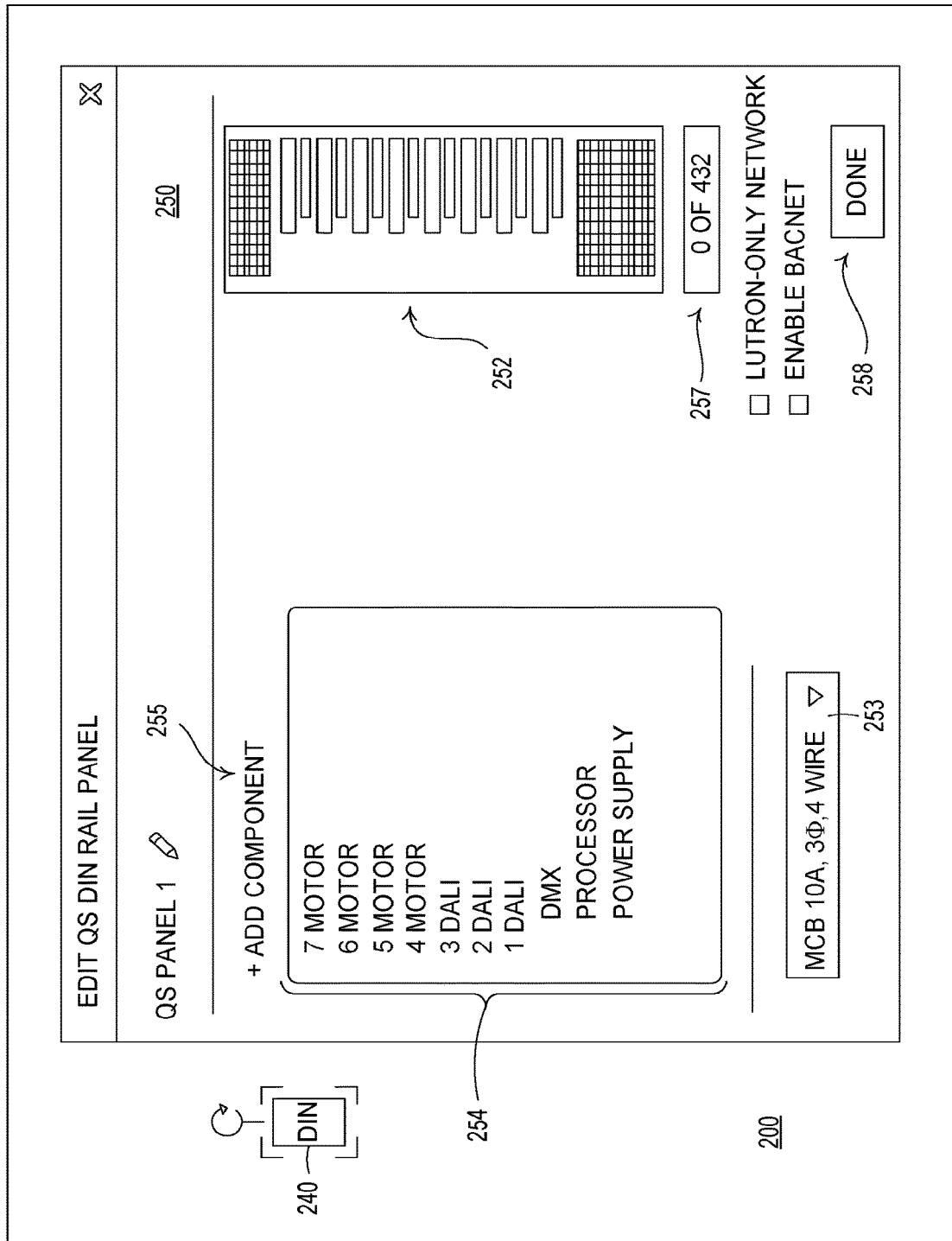

If the user hovers the cursor 202 over one of the control devices in the listing 254, a deletion button 260 (e.g., signified by a "x" character) may be displayed on the listing next to the selected control device as shown in FIG. 13. If the deletion button 260 is selected, a deletion confirmation button 262 (e.g., having a bright color and including the word "delete") may be displayed on the listing 254 next to the selected control device, as shown in FIG. 14. If the deletion confirmation button 262 is selected, the selected control device may be deleted from the listing 254, as shown in FIG. 15.

Figure 16:
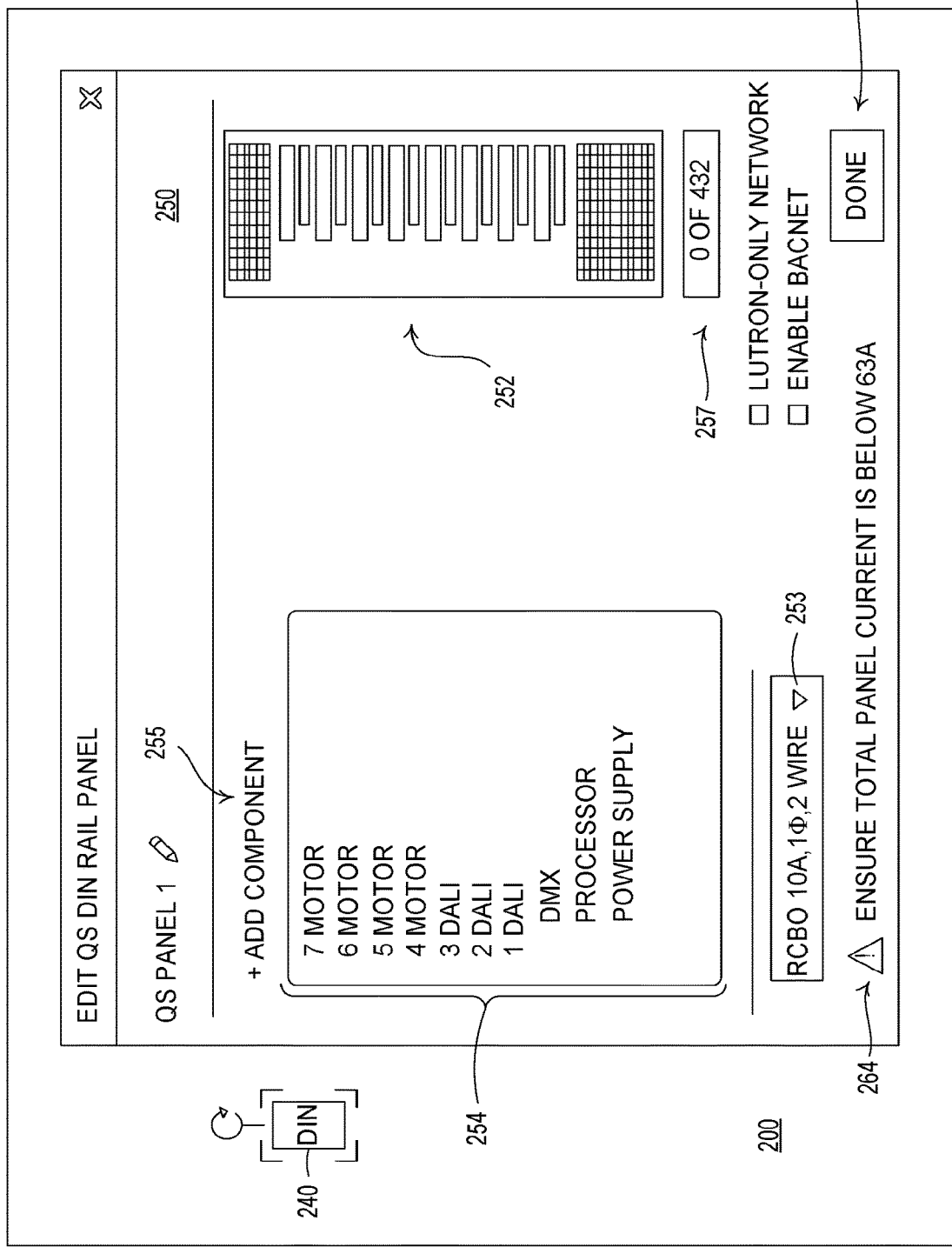

As shown in FIG. 16, the panel configuration window 250 may display a warning 264 about the total load current being supplied by the load control panel. For example, the warning 264 may be displayed depending upon the number and type of load control devices in the load control panel as well as the circuit breaker selected in the circuit breaker pull-down menu 253.

Figure 17:
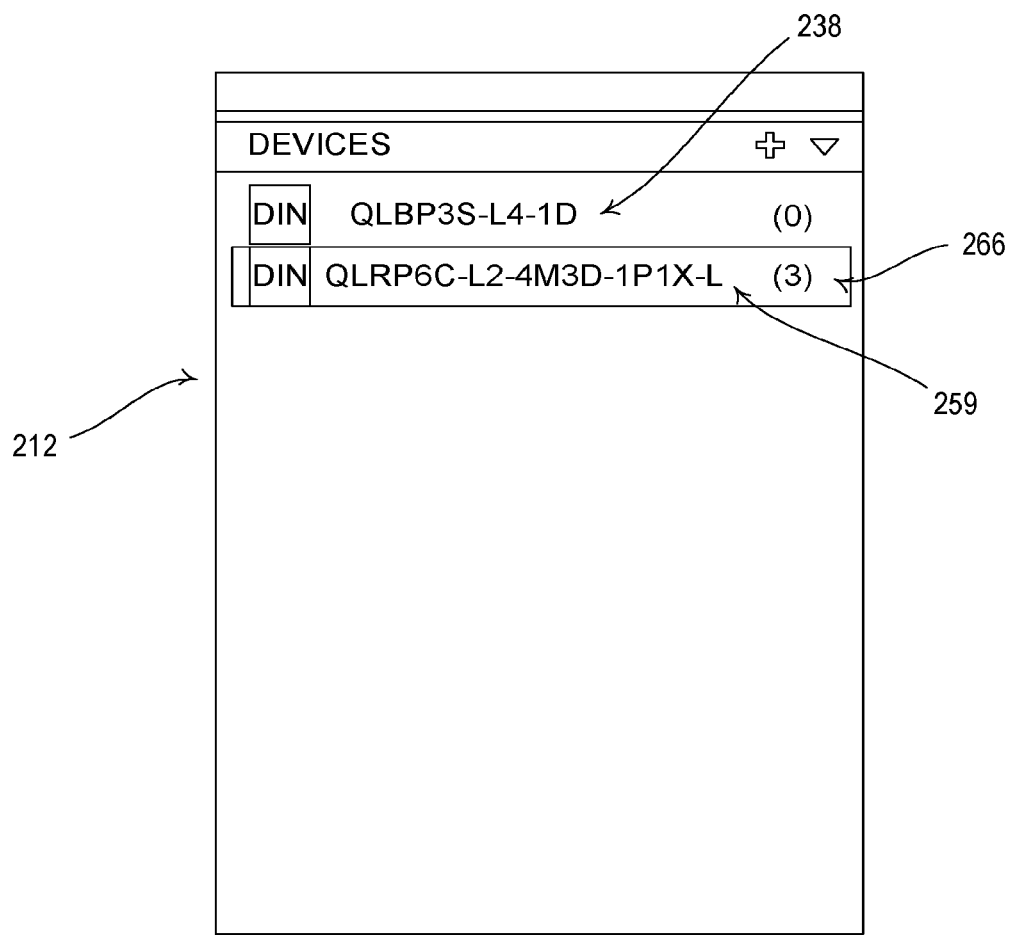
Figure 18:
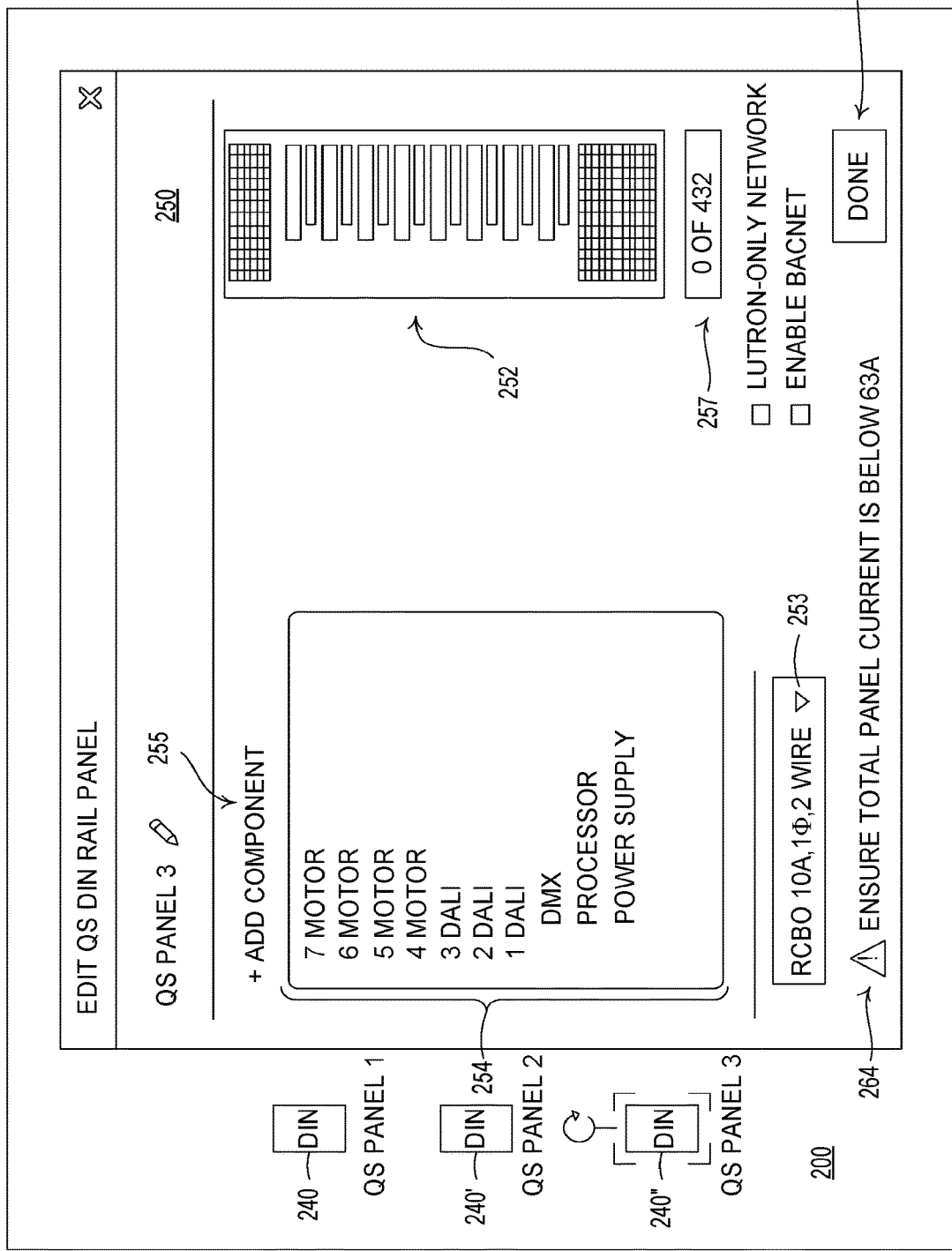

The user may select the "done" button 258 on the panel configuration window 250 when the user is finished editing the load control panel. After the user selects the "done" button 258, the panel configuration window 250 may close and the model number (e.g., the specific DIN rail panel module number 259) on the devices window 212 of the palette column 210 may be updated to reflect the changes made to the DIN rail panel, as shown in FIG. 17. As shown in FIG. 18, the user may select the specific DIN rail panel module number 259 from the devices window 212 and place (e.g., drop, stamp, or drag) additional panel icons 240', 240" onto the canvas 200 to add additional DIN rail panels that may have the same configuration and model number as the previously-configured DIN rail panel. A number 266 of panels located next to the specific DIN rail panel module number 259 on the devices window 212 may be adjusted to reflect the number of DIN rail panels on the canvas 200, as shown in FIG. 17.

Figure 19:
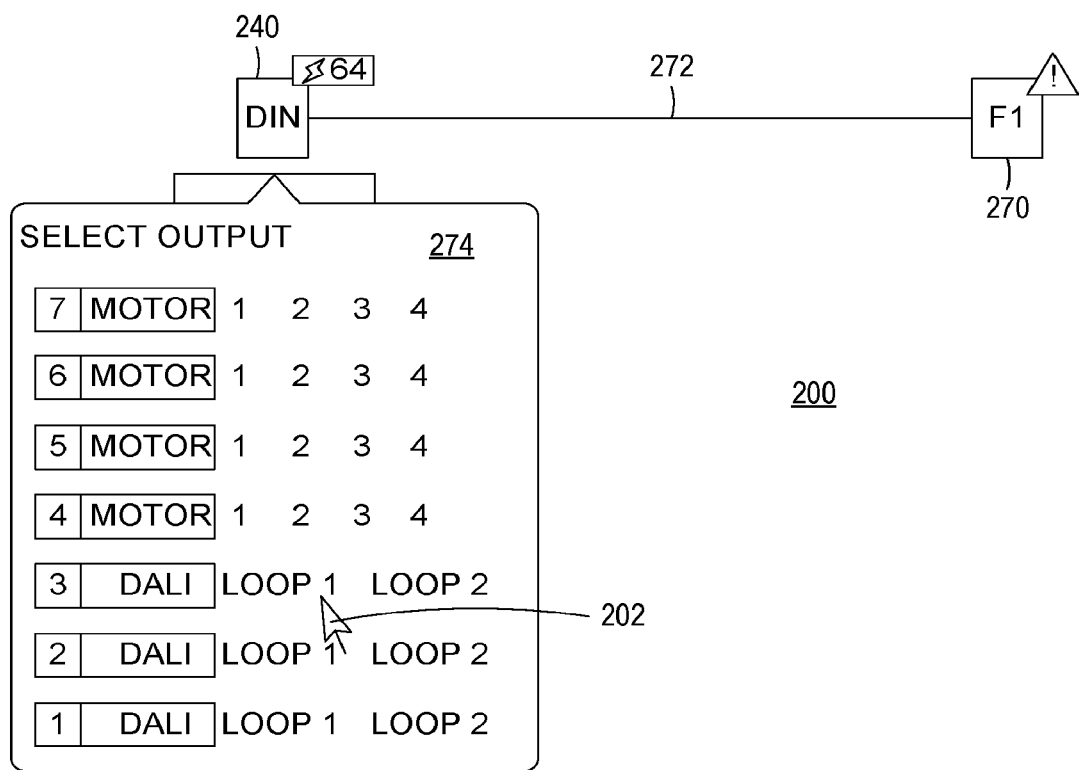
Figure 20:
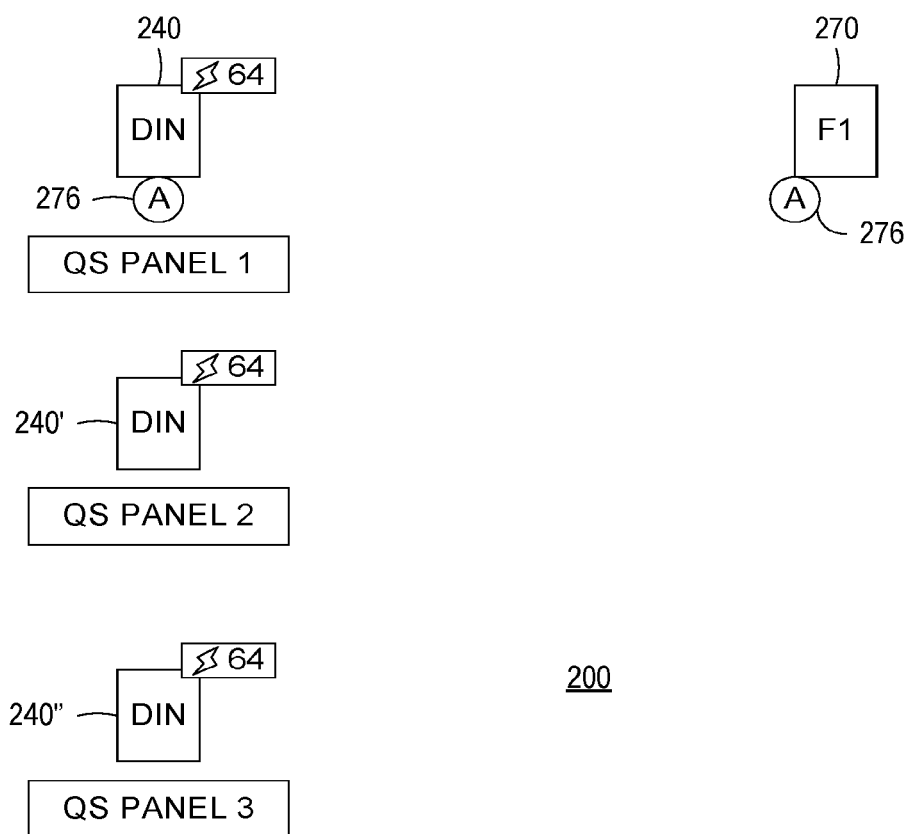

The user may define a relationship (e.g., a connection and/or an association) between a load control panel and one or more electrical devices (e.g., electrical loads and/or load control devices). For example, the user may draw a line 272 from the panel icon 240 to a device icon, such as a fixture icon 270 representing a lighting fixture having a load control device (e.g., an LED lighting fixture having an LED driver), as shown in FIG. 19. The design software may display a panel output selection window 274 to allow the user to select an output of one of the load control devices of the load control panel to which the lighting fixture represented by the fixture icon 270 should be connected. For example, the user may select "Loop 1" of the DALI control module on the third DIN rail as shown in FIG. 19. The DALI control module of the load control panel may be connected to the LED driver of the lighting fixture via a wired communication link (e.g., a DALI communication link). For example, a plurality of LED drivers may be connected to the digital communication link in any order (i.e., the position along the digital communication link at which the LED drivers are wired to the digital communication link is not critical). After the user selects "Loop 1" of the DALI control module from the panel output selection window 274, the design software may stop generating the line 272 between the panel icon 240 and the fixture icon 270 as shown in FIG. 20. The design software may display a badge 276 having identical notation (e.g., the letter A) on each of the panel icon 240 and the fixture icon 270 to indicate the relationship (e.g., the connection and/or association) between the DALI control module of the load control panel and the LED driver of the lighting fixture.

Figure 21:
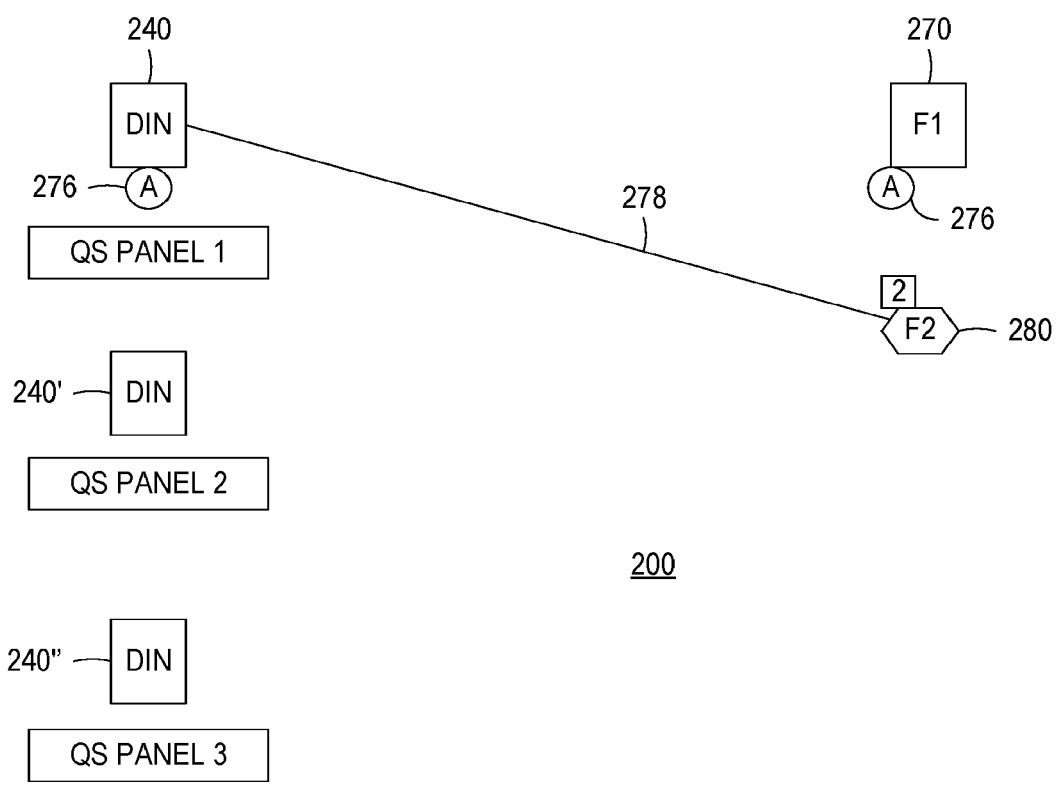
Figure 22:
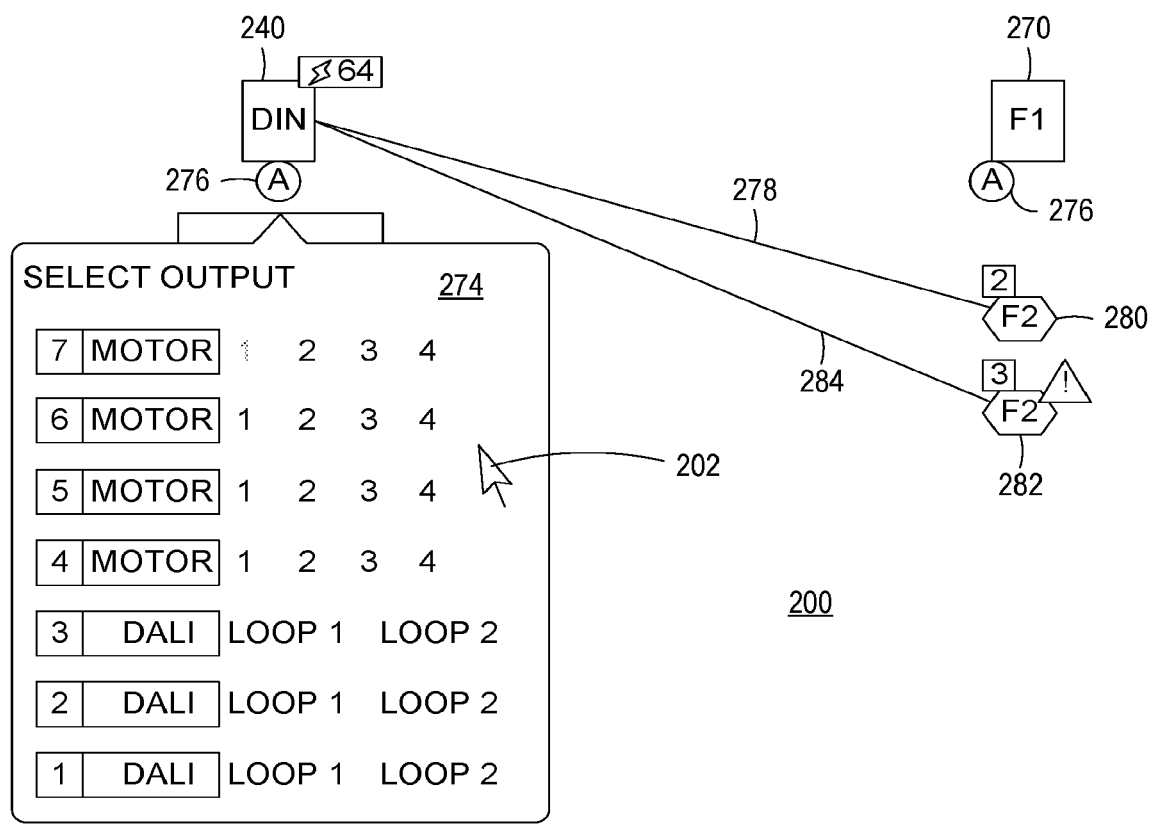

The load control panels may be connected to one or more electrical loads. For example, the user may draw a line 278 from the panel icon 240 to a device icon, such as a first motor load icon 280 representing a first motor load as shown in FIG. 21. The design software may display the panel output selection window 274 to allow the user to select an output of one of the motor control modules of the load control panel to which the first motor load should be connected. For example, the user may select "1" next to the motor control module on the eighth DIN rail to indicate that the first motor load represented by the first motor load icon 280 should be connected to the first output of the top motor control module. After the user selects the output of the motor control module from the panel output selection window 274, the line 278 may remain on the canvas 200 and may be fixed (e.g., secured) between the panel icon 240 and the first motor load icon 280, as shown in FIG. 22. For example, the line 278 may change color after becoming fixed between the panel icon 240 and the first motor load icon 280.

The user may connect the load control panel to a second motor load represented by a second motor load icon 282 by drawing a line 284 between the panel icon 240 and the second motor load icon 282. The user may select an output of one of the motor control modules of the load control panel to which the second motor load should be connected from the panel output selection window 274. The entry for the output to which the first motor load is connected (e.g., "1" next to the motor control module on the seventh DIN rail) may be changed to a different color than the other entries (e.g., grayed out) as shown in FIG. 22, and the output may not be selected while the first motor is connected to that output. The entry for the output to which the first motor load is connected may be deleted from the panel output selection window 274 while the first motor is connected to that output. The user may select one of the other outputs of the motor control modules to which the second motor load should be connected from the panel output selection window 274.

When the user is attempting to connect an output of one of the load control devices to a specific electrical device, the outputs of the load control devices of the load control panel that are not compatible with the specific electrical device may be changed to a different color (e.g., grayed out) and/or may not be selectable from the panel output selection window 274. The outputs of the load control devices of the load control panel that are not compatible with the specific electrical device may be deleted from the panel output selection window 274 (e.g., filtered from the panel output selection window 274).

Figure 23:
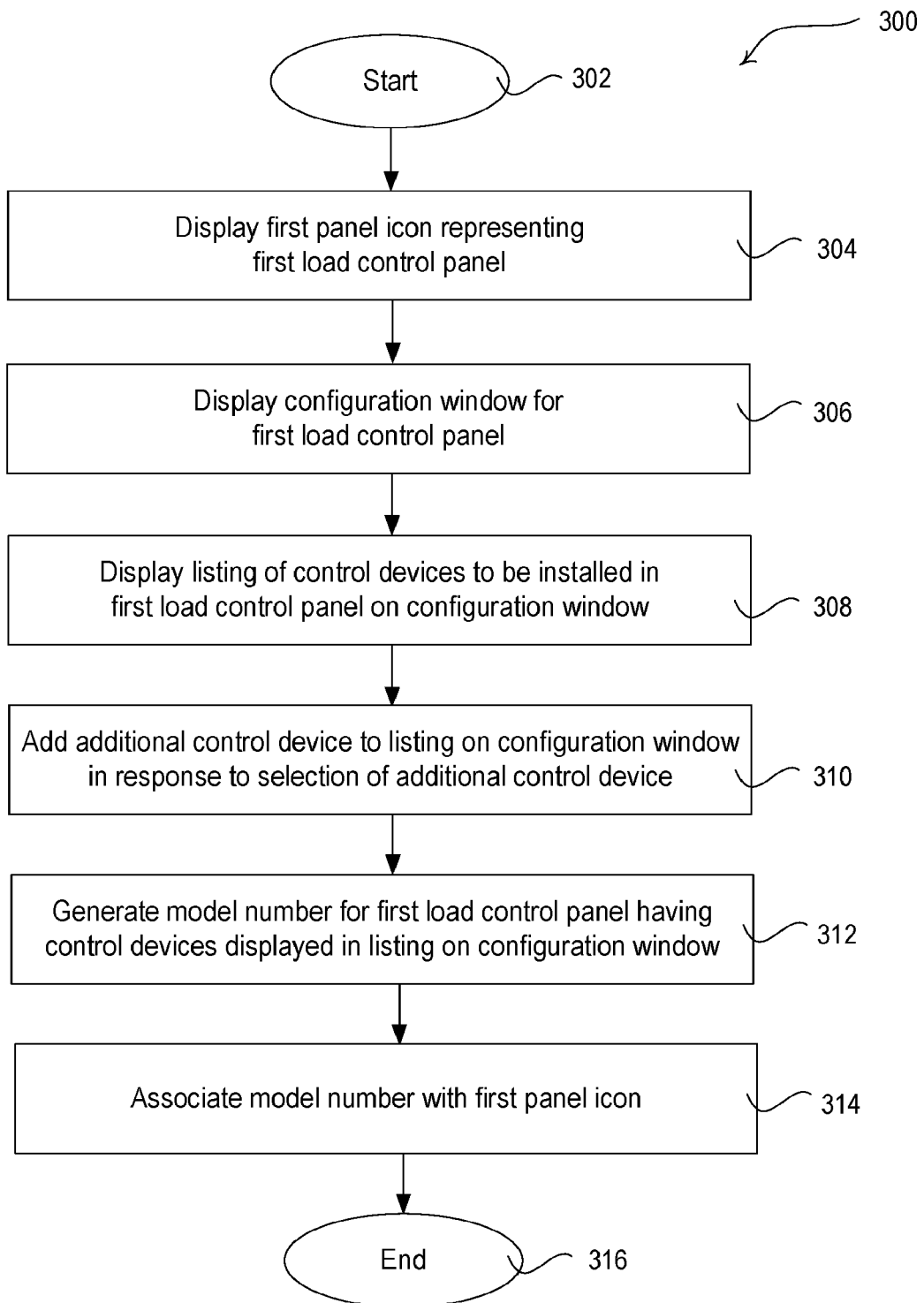
FIGS. 23-24 show flowcharts of example panel configuration procedures for configuring a load control panel of a load control system using a graphical user interface software.

FIG. 23 is a flow diagram of an example panel configuration procedure 300 for configuring a load control system using a graphical user interface software (e.g., a design software). The panel configuration procedure 300 may allow for easy configuration and multiplication of load control panels. The panel configuration procedure 300 may be performed by one or more network devices in a load control system, such as the load control system 100 shown in FIG. 1. The panel configuration procedure 300 may be performed on a single device, or may be distributed across multiple devices. For example, the panel configuration procedure 300, or portions thereof, may be performed by one or more network devices, such as personal computers (PCs), laptops, tablets, smart phones, servers, or equivalent devices having access to a visual display.

The panel configuration procedure 300 may begin at 302. At 304, the design software may display (e.g., display via a GUI) a first panel icon (such as panel icon 240) representing a first load control panel. The first load control panel may be a DIN rail panel that may include one or more DIN rail power modules mounted to DIN rail within the panel. The first load control panel may be a lighting panel. The first panel icon may be displayed on a canvas, such as canvas 200. As shown in FIG. 2, to add a load control panel to the canvas 200, the user may select the "add devices" button 214 on the devices window 212 to display a toolbox window 230, as shown in FIG. 3

At 306, a configuration window (such as configuration window 250) may be displayed for the load control panel, as shown in FIG. 5. The user may select the panel icon 240 with the cursor 202 to display the panel configuration window 250. The panel configuration window 250 may allow the user to select the components (e.g., control devices) to be added to the first load control panel, as described herein. A listing of control devices to be installed in the first load control panel may be displayed on the configuration window, at 308. For example, as shown in FIG. 5, the panel configuration window 250 may display a listing 254 of the control devices of the load control panel. The listing 254 may list, for example, a DALI control module in the load control panel.

At 310, a control device may be added to the listing on the configuration window in response to a selection of an additional control device. For example, as shown in FIG. 6, a control device may be added to the listing 254 on the configuration window 250. To add control devices to the load control panel, the user may click on an "add component" button 255 to display an "add component" window 256, as shown in FIG. 6. For example, the user may select "Processor" from the "add component" window 256 to add a processor to the load control panel, and select "Power Supply" from the "add component" window 256 to add a power supply to the load control panel. As shown on FIG. 7, the image 252 may be updated to show the added components.

A model number may be generated, at 312, for the first load control panel. At 314, the model number may be associated with the first panel icon. For example, as shown in FIG. 8, a model number (e.g., a specific DIN rail panel module number 259) may be associated with a DIN rail panel that was configured using the panel configuration window 250. The devices window 212 may display the model number (e.g., a specific DIN rail panel module number 259) for the DIN rail panel that was configured using the panel configuration window 250. Different combinations of control devices (e.g., load control devices, system controllers, and power supplies) in a DIN rail panel may correspond to a unique model number, which may be displayed as the specific DIN rail panel module number 259 on the devices window 212. The panel configuration procedure 300 may end at 316.

Figure 24:
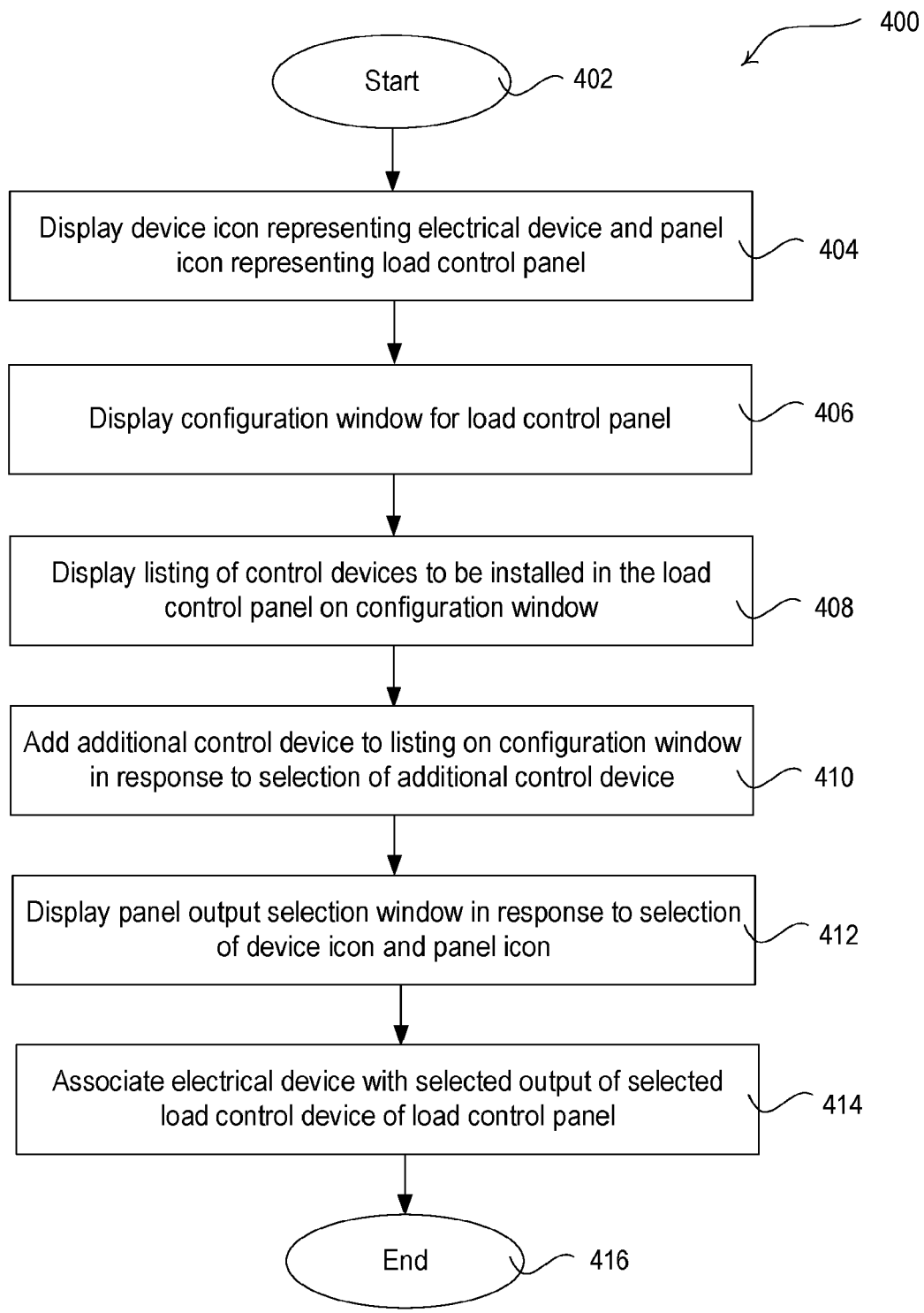

FIG. 24 is a flow diagram of another example panel configuration procedure 400 for configuring a load control system using a graphical user interface software (e.g., a design software). The panel configuration procedure 400 may allow for easy configuration and multiplication of load control panels. The panel configuration procedure 400 may be performed by one or more network devices in a load control system, such as the load control system 100 shown in FIG. 1. The panel configuration procedure 400 may be performed on a single device or may be distributed across multiple devices. For example, the panel configuration procedure 400, or portions thereof, may be performed by one or more network devices, such as personal computers (PCs), laptops, tablets, smart phones, servers, or equivalent devices having access to a visual display.

The panel configuration procedure 400 may begin at 402. At 404, the design software may display (e.g., display via a GUI) a device icon (such as device icon 220, shown on FIG. 2) representing an electrical device and a panel icon (such as panel icon 240, shown on FIG. 5) representing a load control panel. The device icon and the panel icon may be displayed on a canvas, such as canvas 200. At 406, a configuration window (such as configuration window 250, shown on FIG. 5) may be displayed. As shown in FIG. 6, the user may select the panel icon 240 to display the panel configuration window 250. The panel configuration window 250 may allow the user to select the components (e.g., control devices) to be added to the load control panel, as described herein.

A listing of control devices to be installed in the load control panel may be displayed on the configuration window, at 408. For example, as shown in FIG. 9, the panel configuration window 250 may display a listing 254 of the control devices of the load control panel. The panel configuration window 250 may display an image 252 of the panel, e.g., a DIN rail panel having four DIN rails. The panel configuration window 250 may display a zone capacity block 257 to show the total number of zones that the load control panel may control. At 410, a control device may be added to the listing 254 on the configuration window 250. The control device may be added to the listing 254 in response to a selection of additional control devices. To add control devices to the load control panel, the user may click on an "add component" button 255 to display an "add component" window 256, as shown in FIG. 6.

At 412, a panel output selection window may be displayed. For example, as shown in FIG. 19, the panel output selection window 274 may be displayed in response to selection of a device icon (such as fixture icon 270, shown on FIG. 19) representing an electrical device (e.g., a lighting fixture having a load control device) and/or a panel icon 240 (such as panel icon 240, shown on FIG. 19) representing a load control panel. The panel output selection window 274 may be displayed to allow the user to select an output of one of the load control devices of the load control panel to which the lighting fixture represented by the fixture icon 270 should be connected. The electrical device (e.g., represented by fixture icon 270) may be associated with the output of the selected load control device of the load control panel (e.g., represented by the panel icon 240), at 416. The panel configuration procedure 400 may end at 416.

Figure 25:
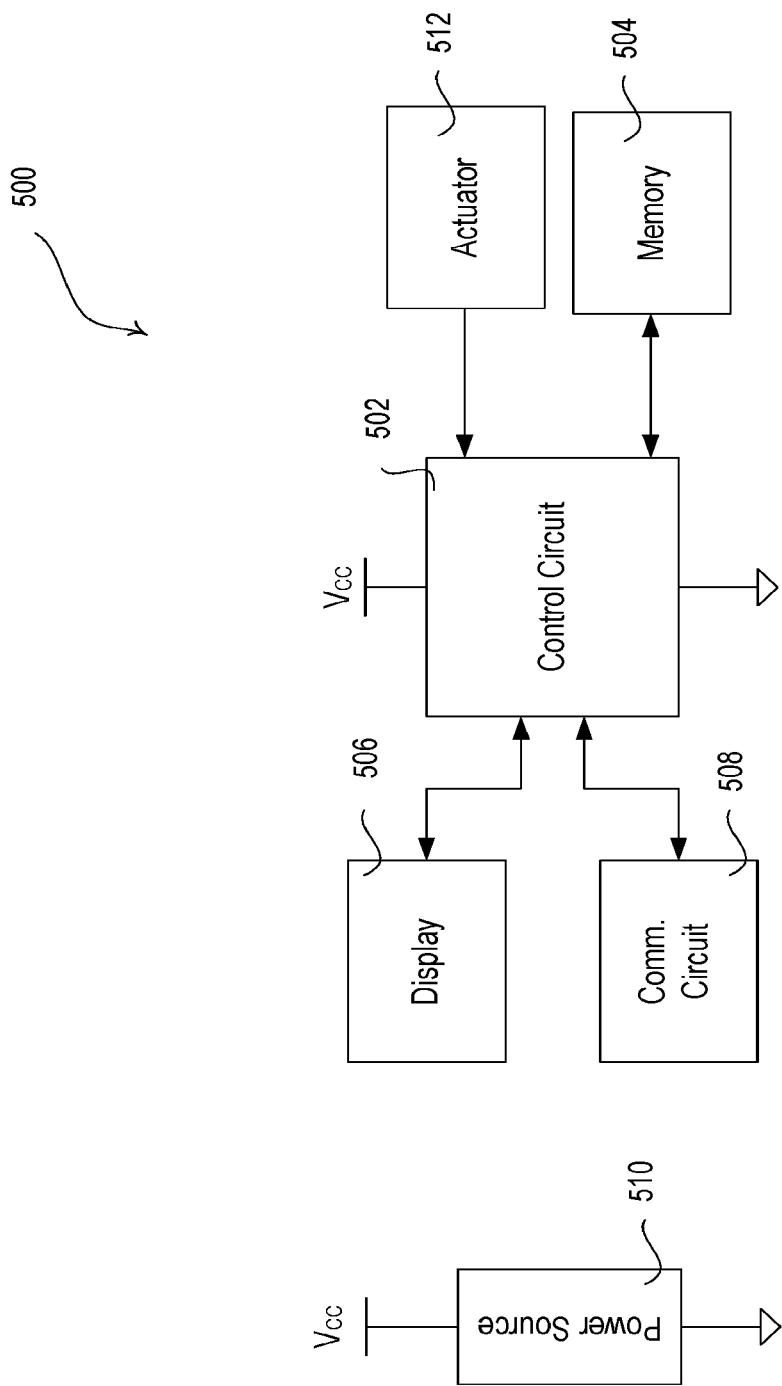
FIG. 25 is a block diagram of an example network device.

FIG. 25 is a block diagram illustrating an example network device 500 as described herein. For example, the network device 500 may be the computer 144 or another computing device. The network device 500 may include a control circuit 502 for controlling the functionality of the network device 500. The control circuit 502 may include one or more general purpose processors, special purpose processors, conventional processors, digital signal processors (DSPs), microprocessors, integrated circuits, a programmable logic device (PLD), application specific integrated circuits (ASICs), or the like. The control circuit 502 may perform signal coding, data processing, power control, input/output processing, or any other functionality that enables the network device 500 to perform as described herein. The control circuit 502 may store information in and/or retrieve information from the memory 504. The memory 504 may include a non-removable memory and/or a removable memory. The non-removable memory may include random-access memory (RAM), read-only memory (ROM), a hard disk, or any other type of non-removable memory storage. The removable memory may include a subscriber identity module (SIM) card, a memory stick, a memory card, or any other type of removable memory.

The network device 500 may include a communications circuit 508 for transmitting and/or receiving information. The communications circuit 508 may perform wireless and/or wired communications. The communications circuit 508 may include an RF transceiver or other circuit capable of performing wireless communications via an antenna. Communications circuit 508 may be in communication with control circuit 502 for transmitting and/or receiving information.

The control circuit 502 may be in communication with a display 506 for providing information to a user. The processor 502 and/or the display 506 may generate GUIs for being displayed on the network device 500. The display 506 and the control circuit 502 may be in two-way communication, as the display 506 may include a touch screen module capable of receiving information from a user and providing such information to the control circuit 502. The network device 500 may include an actuator 512 (e.g., one or more buttons) that may be actuated by a user to communicate user selections to the control circuit 502.

Each of the modules within the network device 500 may be powered by a power source 510. The power source 510 may include an AC power supply or DC power supply, for example. The power source 510 may generate a supply voltage Vcc for powering the modules within the network device 500.

Figure 26:
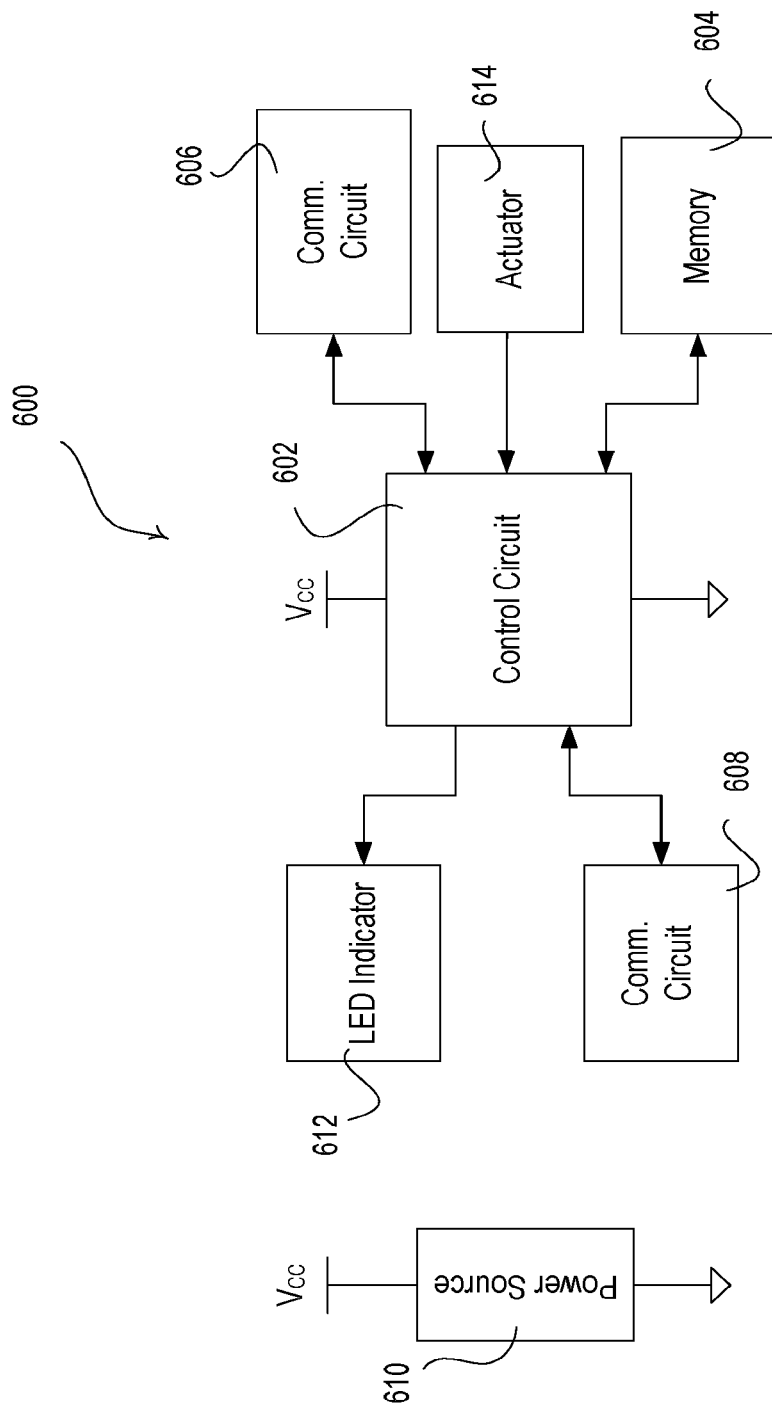
FIG. 26 is a block diagram of an example system controller.

FIG. 26 is a block diagram illustrating an example system controller 600 (such as system controller 150, described herein). The system controller 600 may include a control circuit 602 for controlling the functionality of the system controller 600. The control circuit 602 may include one or more general purpose processors, special purpose processors, conventional processors, digital signal processors (DSPs), microprocessors, integrated circuits, a programmable logic device (PLD), application specific integrated circuits (ASICs), or the like. The control circuit 602 may perform signal coding, data processing, power control, input/output processing, or any other functionality that enables the system controller 600 to perform as described herein. The control circuit 602 may store information in and/or retrieve information from the memory 604. The memory 604 may include a non-removable memory and/or a removable memory. The non-removable memory may include random-access memory (RAM), read-only memory (ROM), a hard disk, or any other type of non-removable memory storage. The removable memory may include a subscriber identity module (SIM) card, a memory stick, a memory card, or any other type of removable memory.

The system controller 600 may include a communications circuit 606 for transmitting and/or receiving information. The communications circuit 606 may perform wireless and/or wired communications. The system controller 600 may also, or alternatively, include a communications circuit 608 for transmitting and/or receiving information. The communications circuit 606 may perform wireless and/or wired communications. Communications circuits 606 and 608 may be in communication with control circuit 602. The communications circuits 606 and 608 may include RF transceivers or other communications modules capable of performing wireless communications via an antenna. The communications circuit 606 and communications circuit 608 may be capable of performing communications via the same communication channels or different communication channels. For example, the communications circuit 606 may be capable of communicating (e.g., with a network device, over a network, etc.) via a wireless communication channel (e.g., BLUETOOTH®, near field communication (NFC), WIFI®, WI-MAX®, cellular, etc.) and the communications circuit 608 may be capable of communicating (e.g., with control devices and/or other devices in the load control system) via another wireless communication channel (e.g., WI-FI® or a proprietary communication channel, such as CLEAR CONNECT™).

The control circuit 602 may be in communication with an LED indicator 612 for providing indications to a user. The control circuit 602 may be in communication with an actuator 614 (e.g., one or more buttons) that may be actuated by a user to communicate user selections to the control circuit 602. For example, the actuator 614 may be actuated to put the control circuit 602 in an association mode and/or communicate association messages from the system controller 600.

Each of the modules within the system controller 600 may be powered by a power source 610. The power source 610 may include an AC power supply or DC power supply, for example. The power source 610 may generate a supply voltage Vcc for powering the modules within the system controller 600.

Figure 27:
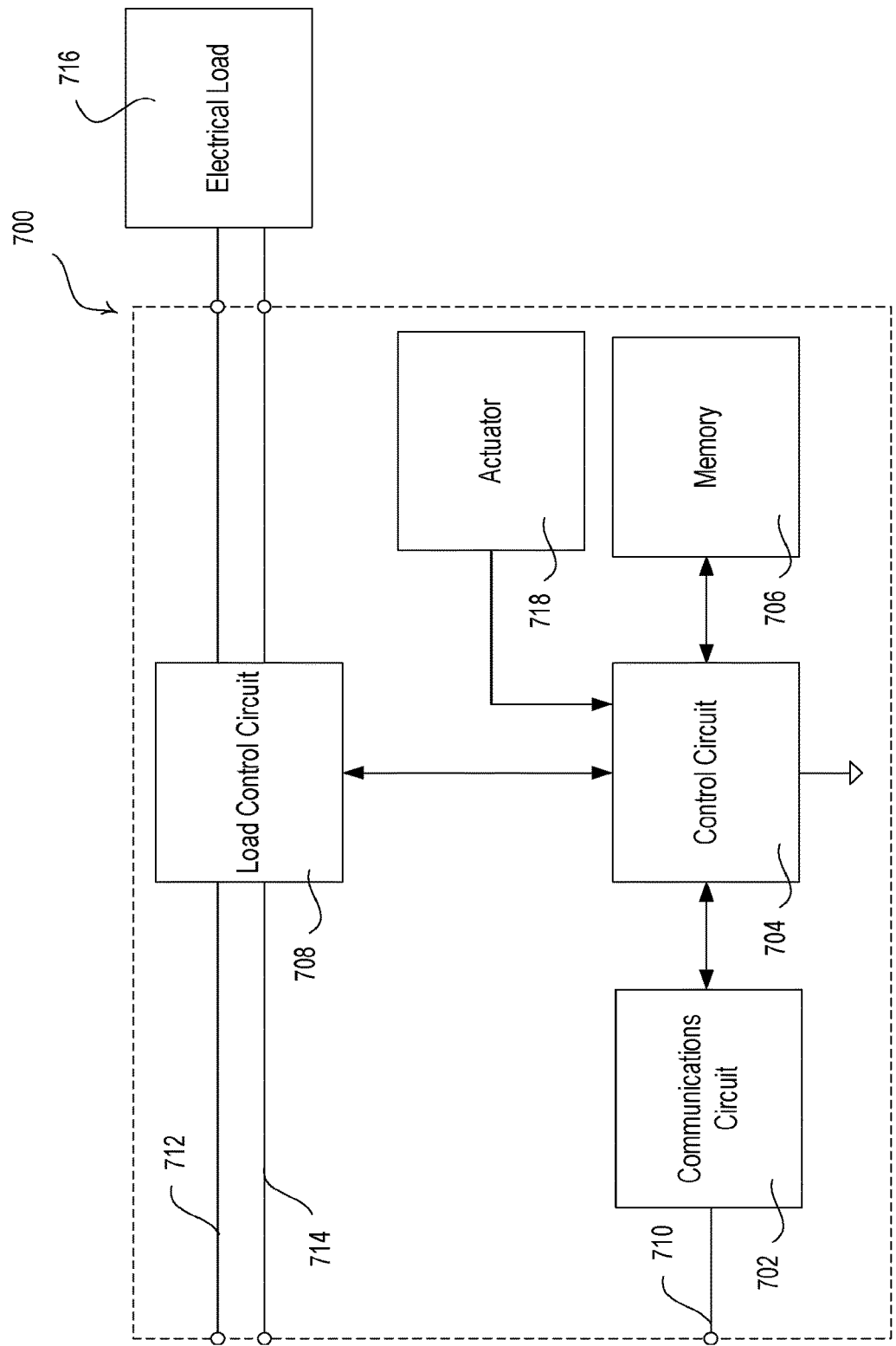
FIG. 27 is a block diagram of an example control-target device.

FIG. 27 is a block diagram illustrating an example control-target device, e.g., a load control device 700, as described herein. The load control device 700 may be a dimmer switch, an electronic switch, an electronic ballast for lamps, an LED driver for LED light sources, an AC plug-in load control device, a temperature control device (e.g., a thermostat), a motor drive unit for a motorized window treatment, or other load control device. The load control device 700 may include a communications circuit 702. The communications circuit 702 may include a receiver, an RF transceiver, or other communications module capable of performing wired and/or wireless communications via communications link 710. The communications circuit 702 may be in communication with control circuit 704. The control circuit 704 may include one or more general purpose processors, special purpose processors, conventional processors, digital signal processors (DSPs), microprocessors, integrated circuits, a programmable logic device (PLD), application specific integrated circuits (ASICs), or the like. The control circuit 704 may perform signal coding, data processing, power control, input/output processing, or any other functionality that enables the load control device 700 to perform as described herein.

The control circuit 704 may store information in and/or retrieve information from the memory 706. For example, the memory 706 may maintain a registry of associated control devices and/or control configuration instructions. The memory 706 may include a non-removable memory and/or a removable memory. The load control circuit 708 may receive instructions from the control circuit 704 and may control the electrical load 716 based on the received instructions. The load control circuit 708 may send status feedback to the control circuit 704 regarding the status of the electrical load 716. The load control circuit 708 may receive power via the hot connection 712 and the neutral connection 714 and may provide an amount of power to the electrical load 716. The electrical load 716 may include any type of electrical load.

The control circuit 704 may be in communication with an actuator 718 (e.g., one or more buttons) that may be actuated by a user to communicate user selections to the control circuit 704. For example, the actuator 718 may be actuated to put the control circuit 704 in an association mode and/or communicate association messages from the load control device 700.

Figure 28:
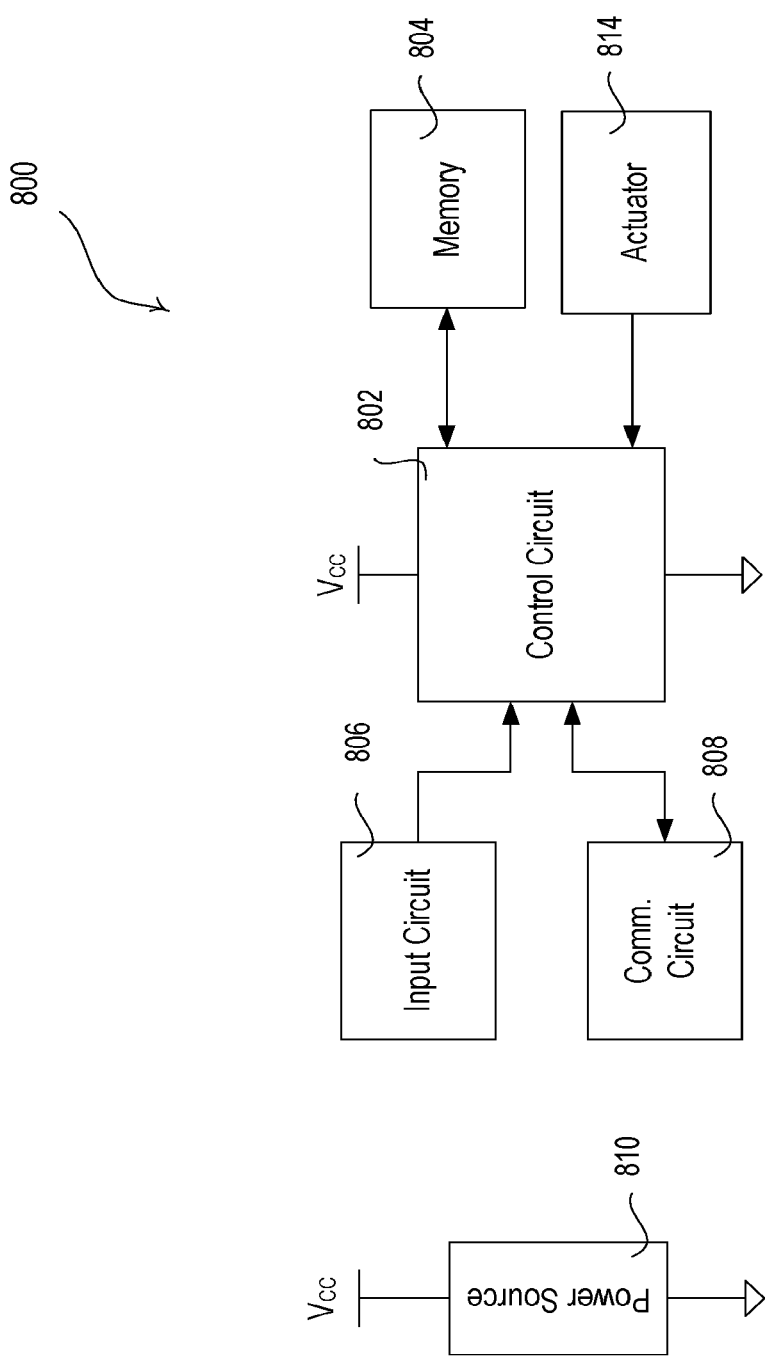
FIG. 28 is a block diagram of an example control-source device.

FIG. 28 is a block diagram illustrating an example control-source device 800 as described herein. The control-source device 800 may be a remote control device, an occupancy sensor, a daylight sensor, a window sensor, a temperature sensor, and/or the like. The control-source device 800 may include a control circuit 802 for controlling the functionality of the control-source device 800. The control circuit 802 may include one or more general purpose processors, special purpose processors, conventional processors, digital signal processors (DSPs), microprocessors, integrated circuits, a programmable logic device (PLD), application specific integrated circuits (ASICs), or the like. The control circuit 802 may perform signal coding, data processing, power control, input/output processing, or any other functionality that enables the control-source device 800 to perform as described herein.

The control circuit 802 may be in communication with an actuator 814 (e.g., one or more buttons) that may be actuated by a user to communicate user selections to the control circuit 802. For example, the actuator 814 may be actuated to put the control circuit 802 in an association mode and/or communicate association messages from the control-source device 800. The control circuit 802 may store information in and/or retrieve information from the memory 804. The memory 804 may include a non-removable memory and/or a removable memory, as described herein.

The control-source device 800 may include a communications circuit 808 for transmitting and/or receiving information. The communications circuit 808 may transmit and/or receive information via wired and/or wireless communications. The communications circuit 808 may include a transmitter, an RF transceiver, or other circuit capable of performing wired and/or wireless communications. The communications circuit 808 may be in communication with control circuit 802 for transmitting and/or receiving information.

The control circuit 802 may be in communication with an input circuit 806. The input circuit 806 may include an actuator (e.g., one or more buttons) or a sensor circuit (e.g., an occupancy sensor circuit, a daylight sensor circuit, or a temperature sensor circuit) for receiving input that may be sent to a device for controlling an electrical load. For example, the control-source device may receive input from the input circuit 806 to put the control circuit 802 in an association mode and/or communicate association messages from the control-source device. The control circuit 802 may receive information from the input circuit 806 (e.g., an indication that a button has been actuated or sensed information). Each of the modules within the control-source device 800 may be powered by a power source 810.

Although features and elements are described herein in particular combinations, each feature or element can be used alone or in any combination with the other features and elements. The methods described herein may be implemented in a computer program, software, or firmware incorporated in a computer-readable medium for execution by a computer or processor. Examples of computer-readable media include electronic signals (transmitted over wired or wireless connections) and tangible/non-transitory computer-readable storage media. Examples of tangible/non-transitory computer-readable storage media include, but are not limited to, a read only memory (ROM), a random access memory (RAM), removable disks, and optical media such as CD-ROM disks, and digital versatile disks (DVDs).

The invention claimed is:

1. An electrical load controller configuration system, comprising:
   processor circuitry to generate a load control system configuration graphical user interface (GUI) on one or more output devices, the GUI to:
   provide a canvas for placement of one or more control-source icons, each representing a respective electrical control-source device and one or more control-target icons, each representing a respective electrical control-target device;
   graphically link at least some of the one or more control-source icons to at least some of the one or more the control target icons to selectively create an association between respective ones of the control-source devices and the control-target devices;
   select load control components to configure a load control panel, wherein the load control panel includes one or more design parameters;
   determine whether the selected load control components comply with the one or more load control panel design parameters; and
   responsive to a determination that selected load control components comply with the one or more load control panel design parameters;
   generate a model number for the load control panel including the selected load control components; and
   create associations between at least a portion of the selected load control components and at least one of: the one or more control-source devices or the one or more control-target devices.

2. The system of claim 1 the processor circuitry to further:
   generate a graphical output indicative of the non-compliance responsive to the determination that selected load control components do not comply with the one or more load control panel design parameters.

3. The system of claim 1, further comprising:
   memory circuitry communicatively coupled to the processor circuitry;
   wherein the processor circuitry to further store in the memory circuitry, data representative of:
   the load control panel configuration including the selected load control components;
   the generated part number associated with the load control panel;
   the associations between the one or more electrical control-source devices and the one or more electrical control-target devices; and
   the associations between at least the portion of the selected load control components and the at least one of: the one or more control-source devices or the one or more control-target devices.

4. The system of claim 1 wherein to provide the GUI to select load control components to configure the load control panel, the processor circuitry to further:
   provide a GUI to select load control components to configure the load control panel, wherein the load control components include one or more of the following: one or more controllers, one or more processors, or one or more power supplies.

5. An electrical load controller configuration method, comprising:
- providing, by processor circuitry via a graphical user interface (GUI) that includes, a canvas for placement of one or more control-source icons, each representing a respective electrical control-source device and one or more control-target icons, each representing a respective electrical control-target device;
- receiving one or more inputs, via the GUI, that include data representative of one or more associations between at least some of the one or more control-source icons to at least some of the one or more the control target icons to selectively create an association between respective ones of the control-source devices and the control-target devices;
- receiving one or more inputs, via the GUI, that include data representative of one or more load control components to configure a load control panel, wherein the load control panel includes one or more design parameters;
- determining, by the processor circuitry, whether the selected load control components comply with the one or more load control panel design parameters; and
- responsive to a determination by the processor circuitry that selected load control components comply with the one or more load control panel design parameters;
  - generating by the processor circuitry, a model number for the load control panel including the selected load control components; and
  - creating, via the GUI, associations between at least a portion of the selected load control components and at least one of: the one or more control-source devices or the one or more control-target devices.

6. The method of claim 5, further comprising:
generating, by the processor circuitry via the GUI, a graphical output indicative of the non-compliance responsive to the determination that selected load control components do not comply with the one or more load control panel design parameters.

7. The method of claim 5, further comprising:
causing, by the processor circuitry in communicatively coupled memory circuitry, data representative of:
- the load control panel configuration including the selected load control components;
- the generated part number associated with the load control panel;
- the associations between the one or more electrical control-source devices and the one or more electrical control-target devices; and
- the associations between at least the portion of the selected load control components and the at least one of: the one or more control-source devices or the one or more control-target devices.

8. The method of claim 5 wherein selecting the load control components to configure the load control panel further comprises:
receiving one or more inputs, by the processor circuitry via the GUI, that include data representative of the load control components to configure the load control panel, wherein the load control components include one or more of the following: one or more controllers, one or more processors, or one or more power supplies.

9. A non-transitory, machine-readable, storage device that includes instructions that when executed by electrical load controller configuration system processor circuitry, cause the processor circuitry to:
- generate a load control system configuration graphical user interface (GUI) on one or more output devices, the GUI to:
  - provide a canvas for placement of one or more control-source icons, each representing a respective electrical control-source device and one or more control-target icons, each representing a respective electrical control-target device;
  - receive an input that graphically links at least some of the one or more control-source icons to at least some of the one or more the control target icons to selectively create associations between respective ones of the control-source devices and the control-target devices;
  - receive an input that includes data representative of at least one selected load control component to configure a load control panel, wherein the load control panel includes one or more design parameters;
  - determine whether the selected load control components comply with the one or more load control panel design parameters; and
  - responsive to a determination that selected load control components comply with the one or more load control panel design parameters;
    - generate a model number for the load control panel including the selected load control components; and
    - receive an input that creates associations between at least a portion of the selected load control components and at least one of: the one or more control-source devices or the one or more control-target devices.

10. The non-transitory, machine-readable, storage device of claim 9 wherein the instructions, when executed by the electrical load controller configuration system processor circuitry, cause the processor circuitry to:
generate a graphical output indicative of the non-compliance responsive to the determination that selected load control components do not comply with the one or more load control panel design parameters.

11. The non-transitory, machine-readable, storage device of claim 9 wherein the instructions, when executed by the electrical load controller configuration system processor circuitry, cause the processor circuitry to:
store in communicatively coupled memory circuitry, data representative of:
- the load control panel configuration including the selected load control components;
- the generated part number associated with the load control panel;
- the associations between the one or more electrical control-source devices and the one or more electrical control-target devices; and
- the associations between at least the portion of the selected load control components and the at least one of: the one or more control-source devices or the one or more control-target devices.

12. The non-transitory, machine-readable, storage device of claim 9 wherein the instructions that cause the electrical load controller configuration system processor circuitry to provide the GUI to select load control components to configure the load control panel, further cause the processor circuitry to:
provide a GUI to select load control components to configure the load control panel, wherein the load control components include one or more of the following: one or more controllers, one or more processors, or one or more power supplies.

* * * * *